United States Patent
Shibata et al.

(10) Patent No.: US 9,970,624 B2
(45) Date of Patent: May 15, 2018

(54) LAMP DEVICE FOR VEHICLE AND LIGHTING DEVICE FOR VEHICLE

(71) Applicant: KOITO MANUFACTURING CO., LTD., Tokyo (JP)

(72) Inventors: Hiroki Shibata, Shizuoka (JP); Takeyuki Tachiiwa, Shizuoka (JP); Kazutami Oishi, Shizuoka (JP); Satoru Yashiki, Shizuoka (JP); Takashi Inoue, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 167 days.

(21) Appl. No.: 14/913,491

(22) PCT Filed: Aug. 22, 2014

(86) PCT No.: PCT/JP2014/071968
§ 371 (c)(1),
(2) Date: Feb. 22, 2016

(87) PCT Pub. No.: WO2015/025945
PCT Pub. Date: Feb. 26, 2015

(65) Prior Publication Data
US 2016/0201869 A1 Jul. 14, 2016

(30) Foreign Application Priority Data

Aug. 23, 2013 (JP) ................... 2013-173985
Aug. 23, 2013 (JP) ................... 2013-173986
(Continued)

(51) Int. Cl.
*F21S 8/10* (2006.01)
*B60Q 1/068* (2006.01)
*B60Q 1/076* (2006.01)

(52) U.S. Cl.
CPC .......... *F21S 48/328* (2013.01); *B60Q 1/0683* (2013.01); *B60Q 1/076* (2013.01);
(Continued)

(58) Field of Classification Search
CPC .. F21S 48/328; F21S 48/1159; F21S 48/1216; F21S 48/125; F21S 48/1721; B06Q 1/0683; B06Q 1/76
See application file for complete search history.

(56) References Cited

U.S. PATENT DOCUMENTS

2012/0155101 A1  6/2012  Matsumoto et al.
2012/0161633 A1  6/2012  Nishitani et al.
(Continued)

FOREIGN PATENT DOCUMENTS

CN  102483210 A  5/2012
CN  102829417 A  12/2012
(Continued)

OTHER PUBLICATIONS

Communication dated Mar. 28, 2017, from the State Intellectual Property Office of People's Republic of China in counterpart Application No. 201480046766.1.
(Continued)

*Primary Examiner* — Anabel Ton
(74) *Attorney, Agent, or Firm* — Sughrue Mion, PLLC

(57) ABSTRACT

An adjustment mechanism configured to adjust a reference position of an optical axis of a projection lens of a lens unit has a reference axis perpendicular to the optical axis and disposed in a plane which intersects with a focal point of the projection lens. The lens unit moves in an extension direction of the reference axis in accordance with rotation of a second screw. An acting point of a force to move the lens unit is disposed in a plane formed by the optical axis and the reference axis.

7 Claims, 31 Drawing Sheets

(30) Foreign Application Priority Data

Aug. 23, 2013 (JP) ................................ 2013-173987
Aug. 23, 2013 (JP) ................................ 2013-173990

(52) U.S. Cl.
CPC ......... *F21S 48/1159* (2013.01); *F21S 48/125* (2013.01); *F21S 48/1216* (2013.01); *F21S 48/1721* (2013.01); *B60Q 2200/32* (2013.01); *F21S 48/1258* (2013.01)

(56) References Cited

U.S. PATENT DOCUMENTS

| | | |
|---|---|---|
| 2012/0314436 A1 | 12/2012 | Inoue et al. |
| 2013/0201706 A1 | 8/2013 | Suzuki et al. |
| 2016/0025321 A1 | 1/2016 | Inoue et al. |

FOREIGN PATENT DOCUMENTS

| | | |
|---|---|---|
| CN | 103119357 A | 5/2013 |
| JP | 2005-063754 A | 3/2005 |
| JP | 2007-193960 A | 8/2007 |
| JP | 2007-220618 A | 8/2007 |
| JP | 2008-077928 A | 4/2008 |
| JP | 2008-262937 A | 10/2008 |
| JP | 2009-259654 A | 11/2009 |
| JP | 2010-067556 A | 3/2010 |
| JP | 2011-028963 A | 2/2011 |
| JP | 2011-129447 A | 6/2011 |
| JP | 2011-134637 A | 7/2011 |
| JP | 2012-043656 A | 3/2012 |
| JP | 2012-138294 A | 7/2012 |
| JP | 2013-033715 A | 2/2013 |
| JP | 2013-134895 A | 7/2013 |

OTHER PUBLICATIONS

International Search Report for PCT/JP2014/071968 dated Nov. 25, 2014 [PCT/ISA/210].

Written Opinion for PCT/JP2014/071968 dated Nov. 25, 2014 [PCT/ISA/237].

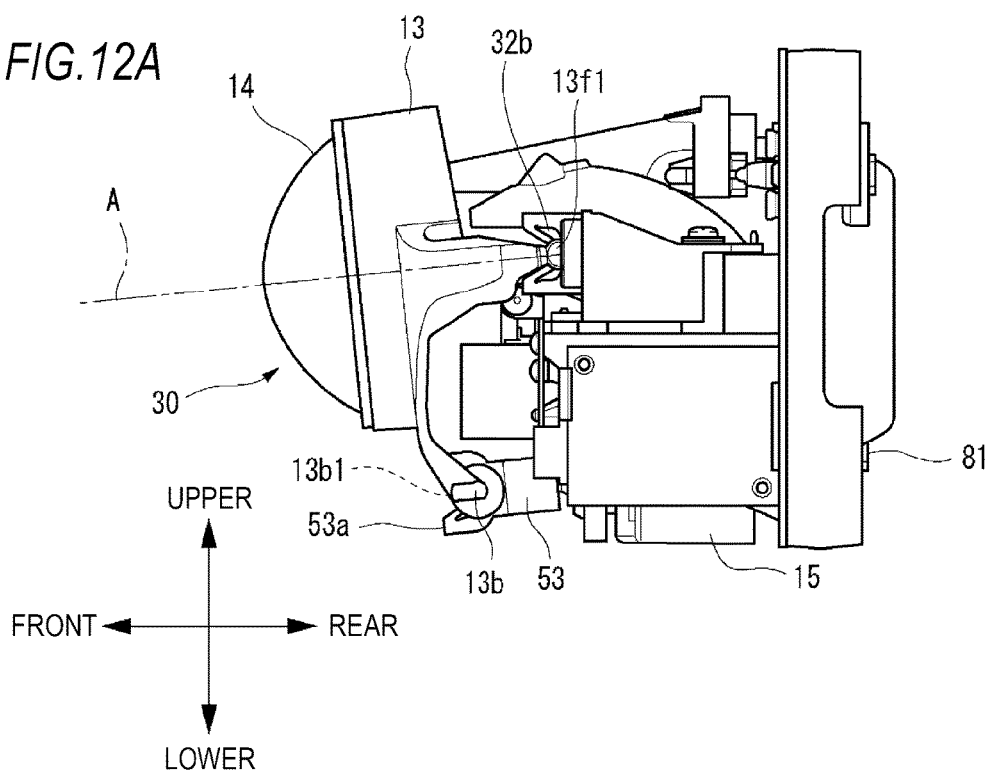
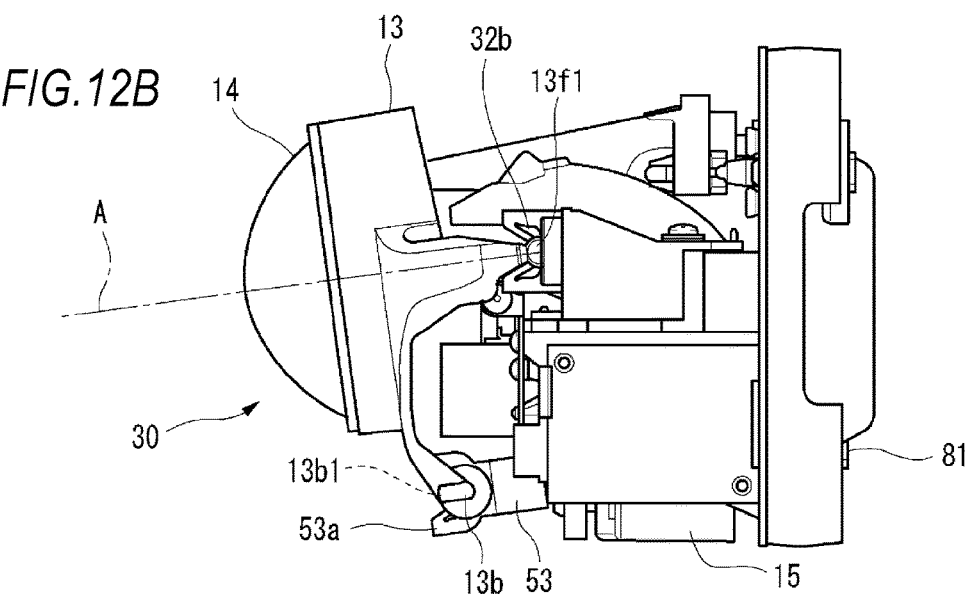

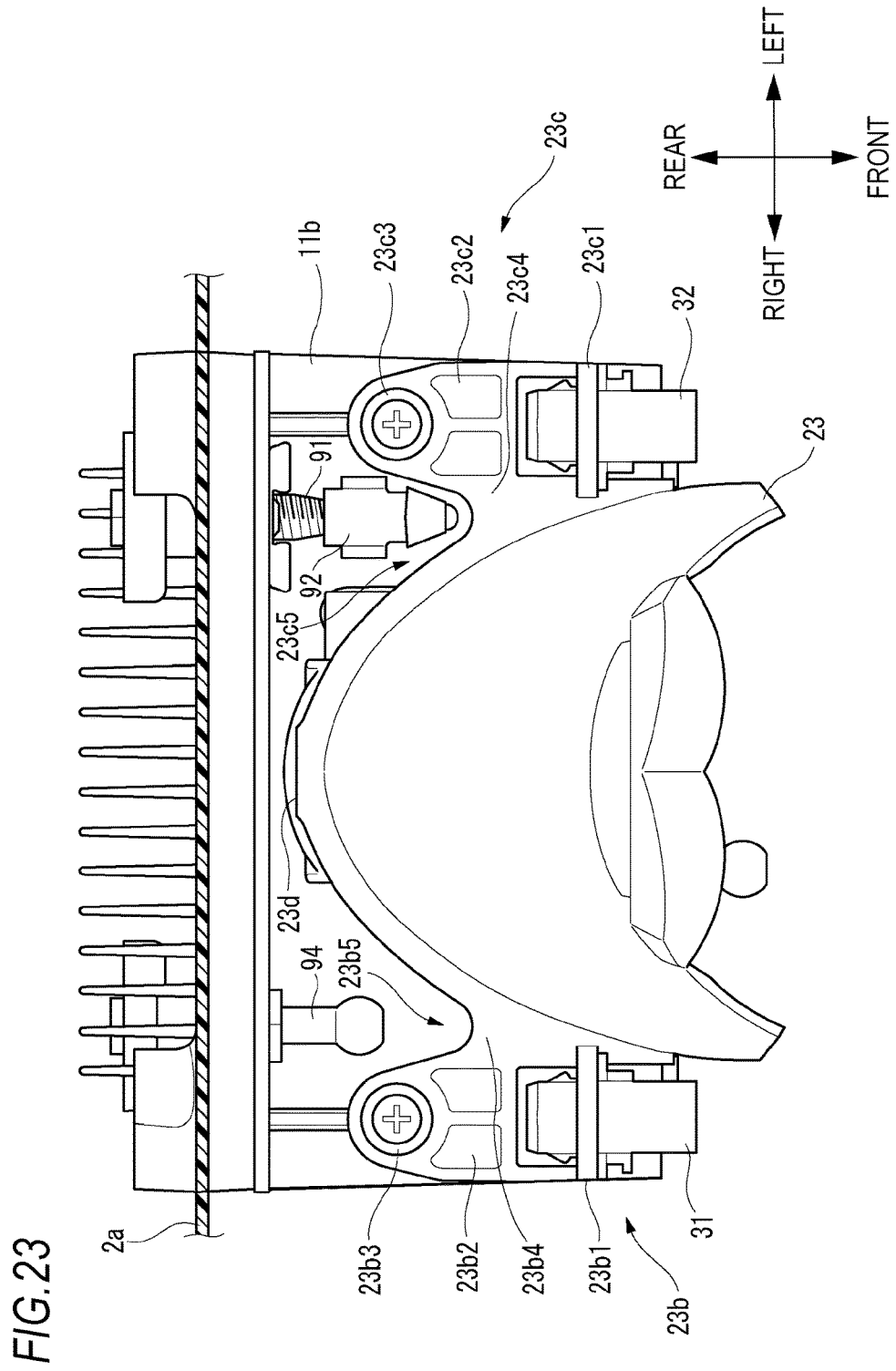

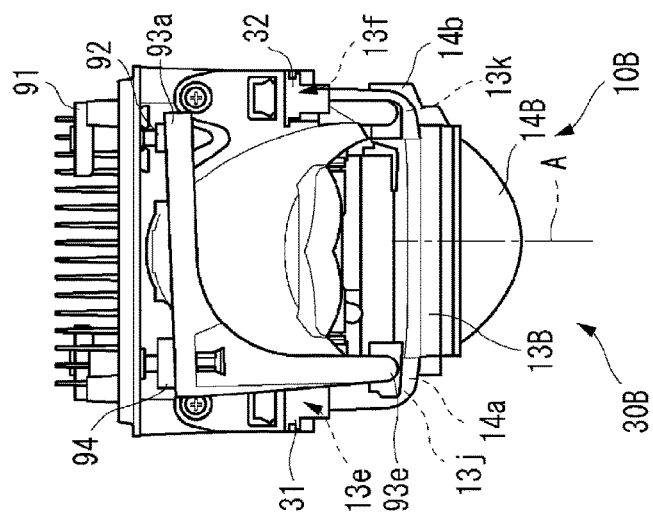
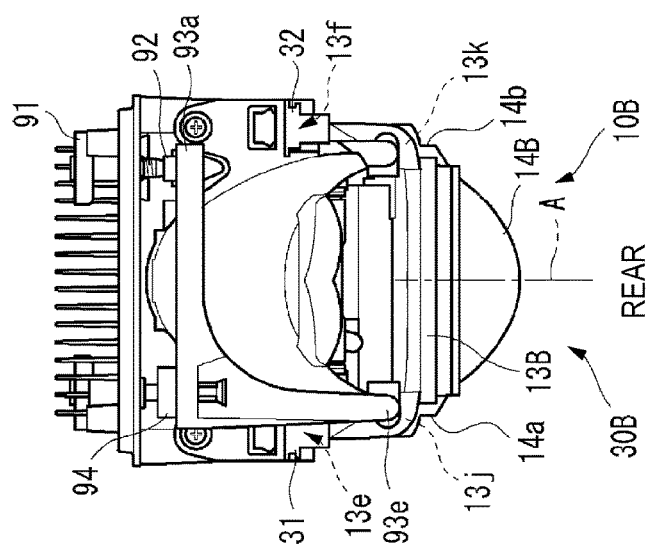
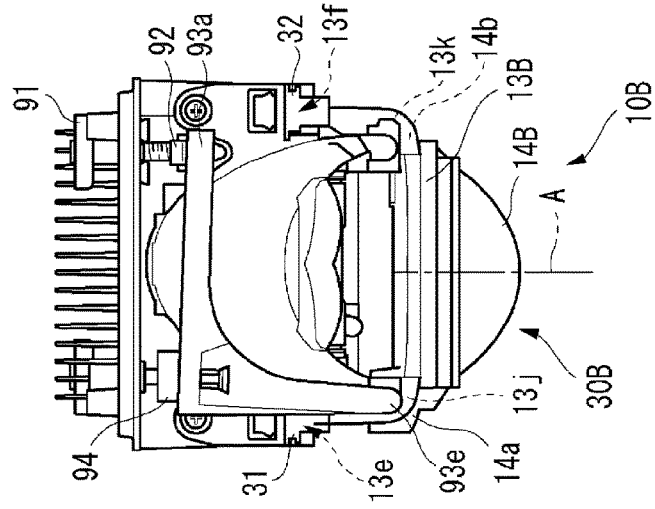

LAMP DEVICE FOR VEHICLE AND LIGHTING DEVICE FOR VEHICLE

TECHNICAL FIELD

The present invention relates to a lamp and a lighting device to be mounted on a vehicle.

BACKGROUND ART

When a lamp including a projection lens is attached to a housing defining a lamp chamber, an error might occur in a reference position of an optical axis of the projection lens with respect to a desired specification. There is known a lamp which includes an aiming mechanism in order to eliminate this error.

The aiming mechanism includes two screws exposed to the outside of the housing. By rotating one of the screws, the reference position in the upper-lower direction of the optical axis of the lamp is adjusted. By rotating the other of the screws, the reference position in the left-right direction of the optical axis of the lamp is adjusted (e.g., see Patent Document 1).

For example, Patent Document 2 discloses a lighting device which includes a heat sink for dissipating heat generated due to light emission of a light source. In the lighting device, the heat sink is disposed outside of the housing to define a portion of a lamp chamber in which the light source is disposed, thereby enhancing the heat dissipation. This lighting device includes a screw for adjusting a reference position of an optical axis of an optical system disposed inside the lamp chamber.

PRIOR ART DOCUMENT

Patent Document

Patent Document 1: JP-A-2012-43656
Patent Document 2: JP-A-2011-134637

SUMMARY OF THE INVENTION

Problems to be Solved

If a mechanism for adjusting the reference position of the optical axis as disclosed in Patent Document 1 is provided in the lamp, an increase in the number of parts and the occupying space thereof cannot be avoided. Consequently, size-reduction of the lighting device, on which the lamp is mounted, is prevented.

Accordingly, a first object of the present invention is to reduce the occupying space of a lamp including a mechanism for adjusting a reference position of an optical axis.

Incidentally, a control circuit for controlling an on/off operation of a light source or an actuator for changing a light distribution state of light emitted from the light source, or the like, can be a heat source. With higher functionality of a lighting device, the number of heat source included in a lamp tends to increase. Therefore, it is necessary to consider the effect of such heat source on the operation state of the light source. On the other hand, size-reduction has been strongly demanded for a lamp and a lighting device which are mounted on a vehicle.

Accordingly, a second object of the present invention is to suppress the effect of a heat source provided in a lamp on the operation state of a light source while meeting the demands of size-reduction.

Further, the screw as disclosed in Patent Document 2 extends across the inside and outside of the housing and stress is generated in accordance with the adjustment operation. Therefore, it is necessary to take countermeasure for preventing water or dust from entering a lamp chamber through a screw installation site. On the other hand, size-reduction has been strongly demanded for a lighting device mounted on a vehicle.

Accordingly, a third object of the present invention is to secure high water and dust resistance while meeting the demands of size-reduction in the configuration where a screw for adjusting a reference position of an optical axis of an optical system disposed in a lamp chamber is provided.

Means for Solving the Problems

A first aspect of the present invention to achieve the first object provides a lamp to be mounted on a vehicle, the lamp comprising:
  a light source;
  a lens unit including a projection lens which is disposed such that at least a portion of light emitted from the light source passes therethrough, and a holder which supports the projection lens; and
  an adjustment mechanism configured to adjust a reference position of an optical axis of the projection lens,
    wherein the adjustment mechanism includes:
    a reference axis perpendicular to the optical axis and disposed in a plane which intersects with a focal point of the projection lens;
    a first screw configured to adjust the reference position in a first direction;
    a second screw configured to adjust the reference position in a second direction intersecting with the first direction;
    a first transmission mechanism configured to rotate the lens unit about the reference axis in accordance with rotation of the first screw; and
    a second transmission mechanism configured to move at least a portion of the lens unit in an extension direction of the reference axis in accordance with rotation of the second screw, and
  wherein an acting point of a force by the second transmission mechanism to move the optical axis is disposed in a plane formed by the optical axis and the reference axis.

According to this configuration, the rotation actions of the first screw and the second screw for adjusting the reference position of the optical axis in different intersecting directions can be applied integrally on the lens unit, and the rotation actions can be converted into the movement relative to a common axis. Especially, the number of parts and the occupying space of the parts can be reduced as compared to the configuration where the rotation action of each screw is applied to a mechanism having different axis. Accordingly, it is possible to reduce the occupying space of the lamp including a mechanism for adjusting the reference position of the optical axis.

The lens unit is rotated about the reference axis in accordance with the rotation of the first screw and is moved in the extension direction of the reference axis in accordance with the rotation of the second screw. Here, the reference axis is perpendicular to the optical axis and located on a plane which intersects with the focal point of the projection lens. Accordingly, a relative position between the focal point and the light source is not changed. As a result, the influence of an operation of adjusting the reference position of the optical axis on the light distribution by the lamp unit can be suppressed.

An acting point of the second transmission mechanism to the lens unit is disposed on the plane which is formed by the optical axis and the reference axis. Therefore, a force to move the lens unit in the left-right direction is applied to the same height as the reference axis, and thus, a moment to move the optical axis in the upper-lower direction is not generated. In this way, the adjustment accuracy of the optical axis can be improved while reducing the number of parts and the occupying space of the parts, as described above.

In the lamp according to the first aspect, the force by the second transmission mechanism to move the optical axis may act on the holder.

According to this configuration, since the force to move the optical axis is directly applied to the lens unit, the desired displacement is achieved with a smaller force. Accordingly, it is possible to reduce the size of the second transmission mechanism. As a result, the occupying space of the lamp which includes a mechanism for adjusting the reference position of the optical axis can be further reduced.

In the lamp according to the first aspect, the projection lens may be supported on the holder to be movable in the extension direction of the reference axis. In this case, the force by the second transmission mechanism to move the optical axis may act on the projection lens.

According to this configuration, the projection lens can be directly moved in the extension direction of the reference axis. In this way, it is possible to suppress a moment of tilting the optical axis in the second direction even when an acting point of the force to move the optical axis is spaced apart from the reference axis with respect to the direction of the optical axis. Accordingly, it is possible to further improve the adjustment accuracy of the optical axis while reducing the occupying space of the lamp including a mechanism for adjusting the reference position of the optical axis.

In the lamp according to the first aspect, the reference axis may be formed on a portion of the holder.

According to this configuration, it is possible to easily form the reference axis for achieving the displacement of the lens unit as described above by using a process of molding the holder. Accordingly, it is possible to further easily achieve a configuration capable of reducing the occupying space of the lamp which includes the mechanism for adjusting the reference position of the optical axis.

In the lamp according to the first aspect, the first direction may correspond to an upper-lower direction of the vehicle.

According to this configuration, it is possible to reduce the dimension in the upper-lower direction, in which restriction on the layout is relatively high when mounted to the lighting device. Accordingly, it is possible to improve the effect of reducing the occupying space of the lamp including the mechanism for adjusting the reference position of the optical axis.

In the lamp according to the first aspect, the first transmission mechanism may include an actuator having a drive shaft for displacing the optical axis in the first direction. In this case, the first screw and the drive shaft are arranged along an extension direction thereof.

According to this configuration, the first screw and the drive shaft of the actuator can be disposed as close as possible, and the adjustment for the reference position of the optical axis of the projection lens and the adjustment for the direction of the optical axis by the actuator can be made substantially on the same axis. In this way, it is possible to reduce the size of the lamp as compared to the configuration where these adjustments are made on the different axis. As a result, it is possible to further reduce the occupying space of the lamp including a mechanism for adjusting the reference position of the optical axis.

The lamp according to the first aspect may further comprise a heat sink which supports the light source. In this case, the first screw and the second screw may extend through the heat sink.

According to this configuration, it is possible not only to reduce the occupying space of the lamp including the mechanism for adjusting the reference position of the optical axis, but also to improve the mounting workability onto the lighting device.

A second aspect of the present invention to achieve the second object provides a lamp to be mounted on a vehicle, the lamp comprising:

a first heat sink including a first portion and a second portion which are at least partially isolated by a gap;

a light source supported on the first portion; and a control part supported on the second portion and having a circuit which is configured to control an on/off operation of the light source.

The heat generated from the circuit of the control part is transmitted to the second portion. However, since the first portion and the second portion are isolated by the gap, the heat generated from the control part is less likely to reach the light source. That is, it is possible to suppress the effect of the heat source on the operation state of the light source even while employing the control part having the heat source in the lamp.

In the lamp according to the second aspect, the control part includes a board on which the circuit is provided, and a second heat sink which is fixed to the second portion and supports the board.

According to this configuration, the heat generated from the circuit of the control part can be more effectively dissipated. Therefore, it is possible to further suppress the effect of the heat source on the operation state of the light source even while employing the control part having the heat source in the lamp.

In the lamp according to the second aspect, the control part may include a heat transfer member disposed between the board and the second heat sink.

In this case, the heat generated from the circuit provided on the board can be more effectively transferred to the second heat sink, and hence, can be dissipated. Therefore, it is possible to further suppress the effect of the heat source on the operation state of the light source even while employing the control part having the heat source in the lamp.

In the lamp according to the second aspect, the control part may include a board made of conductive material and an insulating material layer formed on the surface of the board. In this case, at least a portion of the circuit may be provided on the insulating material layer.

According to this configuration, the board itself can exhibit heat-dissipation function. In this case, it is possible to reduce the number of parts of the control part. Therefore, it is possible to suppress the effect of the heat source on the operation state of the light source while reducing the size of the control part having the heat source in the lamp.

In the lamp according to the second aspect, each of the first portion and the second portion may have a portion extending in a first direction of the first heat sink. In this case, a main surface of the board may extend in a second direction of the first heat sink intersecting with the first direction of the first heat sink.

According to this configuration, it is possible to suppress the effect of the heat source on the operation state of the light source even while employing the control part having the heat source in the lamp. Further, it is possible to provide the lamp having high space utilization efficiency. For example, it is easy to secure a space for disposing an actuator for changing a light distribution state of light emitted from the light source, in the side of the control part. Alternatively, it is possible to effectively utilize a space occurring in the side of the lamp equipped with such actuator.

In the lamp according to the second aspect, each of the first portion and the second portion may have a portion extending in a front-rear direction. In this case, the light source may be disposed on a first side of the portion extending in the front-rear direction, and the control part may be disposed on a second side opposite to the first side of the portion extending in the front-rear direction.

According to this configuration, the heat generated from the control part is less likely to reach the light source. Therefore, it is possible to further suppress the effect of the heat source on the operation state of the light source even while employing the control part as the heat source in the lamp. Further, it is possible to provide the lamp having high space utilization efficiency. For example, it is easy to secure a space for disposing an actuator for changing a light distribution state of light emitted from the light source on the side of the control part. Alternatively, it is possible to effectively utilize a space occurring in the side of the lamp equipped with such actuator.

A third aspect of the present invention to achieve the second object provides a lighting device to be mounted on a vehicle, the lighting device comprising:

a housing having a wall formed with an opening and defining at least a portion of a lamp chamber;

a heat sink having a first portion disposed in the lamp chamber and a second portion exposed to an outside of the housing through the opening;

a light source supported on a first region of the first portion of the heat sink; and a heat source supported on a second region of the first portion of the heat sink, wherein the first region is arranged to avoid a shortest path from the second region to the second portion.

According to this configuration, it is possible to secure a heat dissipation path such that the heat generated from the heat source does not first reach the light source. In this way, the effect of the heat source disposed inside the lamp chamber on the operation state of the light source can be suppressed.

As the heat source, an actuator for changing a light distribution state of light emitted from the light source, a control circuit for controlling the actuator, and a control circuit for controlling an on/off operation of the light source, or the like, can be exemplified.

In the lighting device according to the third aspect, heat generated from the heat source may be transferred to the first portion via a fixing member which fixes the heat source to the second region.

According to this configuration, it is possible to effectively transfer the heat generated from the heat source by using a member which fixes the heat source to the heat sink. Therefore, the effect of the heat source disposed inside the lamp chamber on the operation state of the light source can be further suppressed.

A fourth aspect of the present invention to achieve the third object provides a lighting device to be mounted on a vehicle, the lighting device comprising:

a housing having a wall formed with an opening and defining at least a portion of a lamp chamber;

a light source disposed in the lamp chamber;

an optical system configured to guide a light emitted from the light source in a predetermined direction;

a heat sink supporting the light source;

at least three fixing portions configured to fix the heat sink to the housing;

a first screw configured to adjust a reference position of an optical axis of the optical system in a first direction; and a second screw configured to adjust the reference position in a second direction intersecting with the first direction, wherein a first portion of the heat sink faces an inner surface of the wall, wherein a second portion of the heat sink is exposed to the outside of the wall through the opening, wherein the first screw and the second screw extend through the second portion of the heat sink, wherein the at least three fixing portions are disposed at positions facing the opening on an outside of the wall, and wherein the first screw and the second screw are disposed in a region defined by straight lines connecting the at least three fixing portions to each other.

In the above configuration, both the first screw and the second screw are disposed in the region defined by the straight lines connecting the at least three fixing portions to each other. In other words, both the first screw and the second screw are disposed in the region where a fastening force by the fixing members mounted to the fixing portions is strongly applied in a planar fashion. Accordingly, even when at least one of the first screw and the second screw is subjected to the rotation operation by a tool in order to adjust the reference position of the optical axis of the optical system, the effect of the stress occurring by the operation on the water and dust resistance between the housing and the heat sink can be suppressed.

Further, each fixing portion is disposed at a position facing the opening on the outside of the wall, and the first screw and the second screw extend through the second portion of the heat sink. Therefore, it is possible not only to further reduce the occupying space of the lamp, but also to improve the mounting workability onto the lighting device. The reason is that the heat sink is completely assembled to the housing simply by inserting the second portion through the opening from the inside of the housing.

That is, it is possible to secure a high water and dust resistance while employing the configuration that the first screw and the second screw for adjusting the reference position of the optical axis of the optical system are provided, and meeting the demands of size-reduction.

In the lighting device according to the fourth aspect, a water-resistant member may be disposed between the first portion of the heat sink and the inner surface of the wall.

According to this configuration, it is possible to further reliably prevent moisture or dust from entering the lamp chamber through the opening while meeting the demands of size-reduction.

In the lighting device according to the fourth aspect, an outer surface of the wall may include a first thickness portion having a first thickness and a second thick portion having a second thickness thinner than the first thickness. In this case, the at least three fixing portions are a portion of the first thickness portion.

According to this configuration, the stress caused by the rotation operation of the first screw or the second screw is reliably received by the first thickness portion. Therefore, it is possible to further suppress the effect of the stress on the water and dust resistance between the housing and the heat sink while meeting the demands of size-reduction.

In the lighting device according to the fourth aspect, the second portion of the heat sink may have a plurality of grooves extending in the first direction. In this case, the second thickness portion may be disposed on extension lines of the plurality of grooves.

The heat dissipated through the heat sink moves along the grooves. According to this configuration, since the first thickness portion having a thick thickness is not provided at the heat movement destination, the dissipation of heat can be smoothly performed without being hindered. In this way, it is possible to reduce the size of a structure related to the heat dissipation. As a result, it is possible to meet the demands of additional size-reduction while securing high water and dust resistance.

In the lighting device according to the fourth aspect, the first direction may correspond to an upper-lower direction of the vehicle.

Since the generated heat escapes upward, according to above configuration, the heat dissipated through the heat sink is effectively directed upward along the inside of the grooves. Since the heat dissipation efficiency can be further improved, the size of a structure related to the heat dissipation can be reduced. Therefore, it is possible to meet the demands of additional size-reduction while securing high water and dust resistance.

In the lighting device according to the fourth aspect, an insertion path of a tool for operating at least one of the first screw and the second screw may be defined by a boundary surface between the first thickness portion and the second thickness portion.

According to this configuration, the countermeasure for stress caused by the operation of the first screw and the second screw and the improvement in the workability can be both achieved while meeting the demands of size-reduction.

BRIEF DESCRIPTION OF THE DRAWINGS

FIGS. 12A and 12B are left side views showing an operation of a leveling actuator included in the lamp unit.

FIG. 23 is a plan view showing a portion of the lighting device.

FIGS. 31A to 31C are top views showing an operation of a second aiming mechanism included in the lamp unit shown in FIG. 28.

DETAILED DESCRIPTION OF EMBODIMENTS

Hereinafter, embodiments of the present invention will be described in detail with reference to the accompanying drawings. In each of the drawings used in the following description, the scale of each member is suitably changed in order to have a recognizable size. Further, the "right" and "left" used in the following description indicate the left and right directions as seen from a driver's seat.

Figure 1:
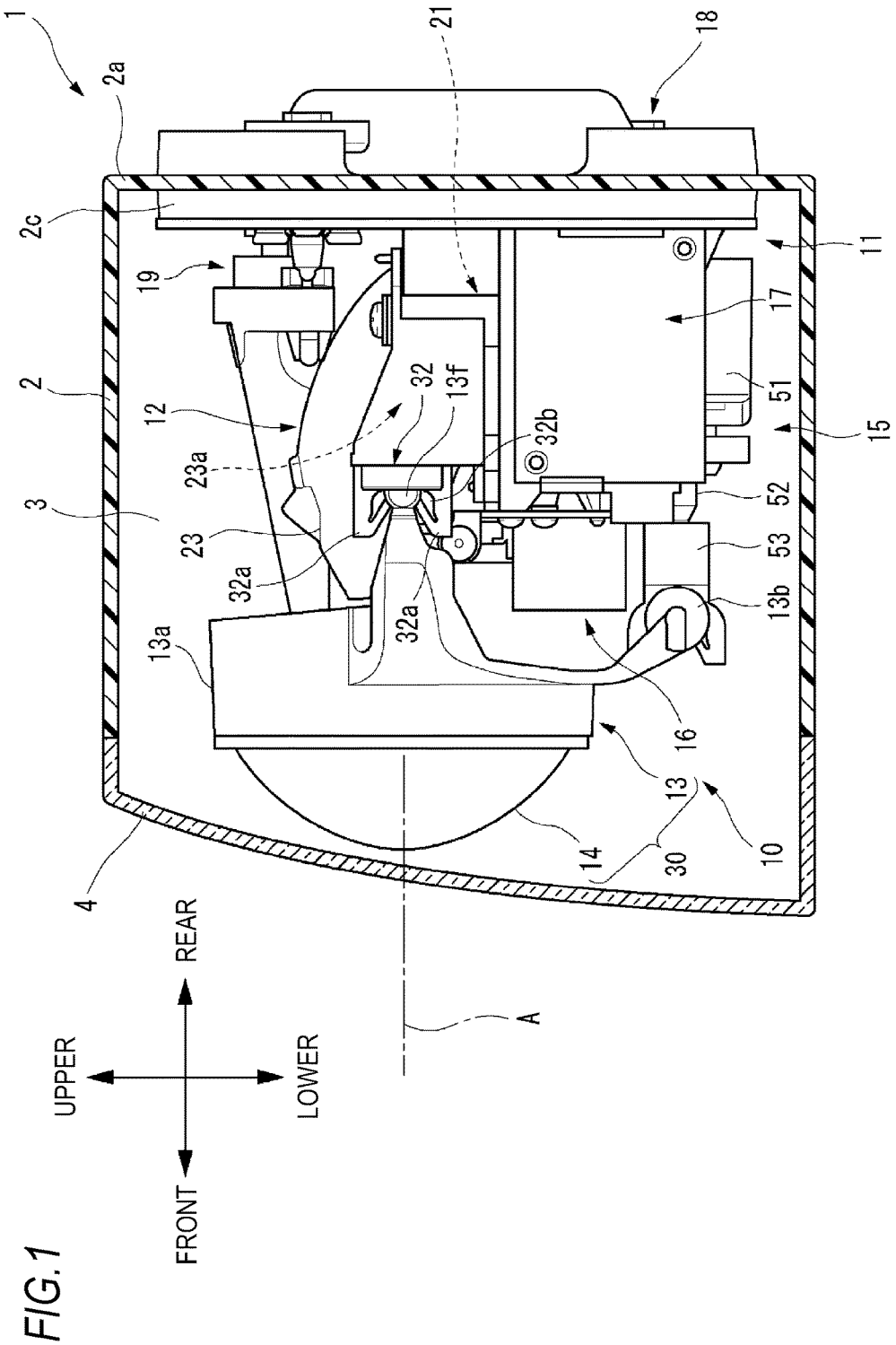
FIG. 1 is a partial cross-sectional left side view showing a lighting device according to an embodiment of the present invention.

FIG. 1 is a view showing a cross-section along an upper-lower direction of a portion of a headlamp device 1 (an example of a lighting device) as seen from the left side. The headlamp device 1 is a device to be mounted on a front portion of a vehicle and configured to illuminate the front. The headlamp device 1 includes a housing 2 and a translucent cover 4 which is mounted to the housing 2 and partitions and forms a lamp chamber 3. A lamp unit 10 (an example of a lamp) is disposed in the lamp chamber 3.

Figure 2:
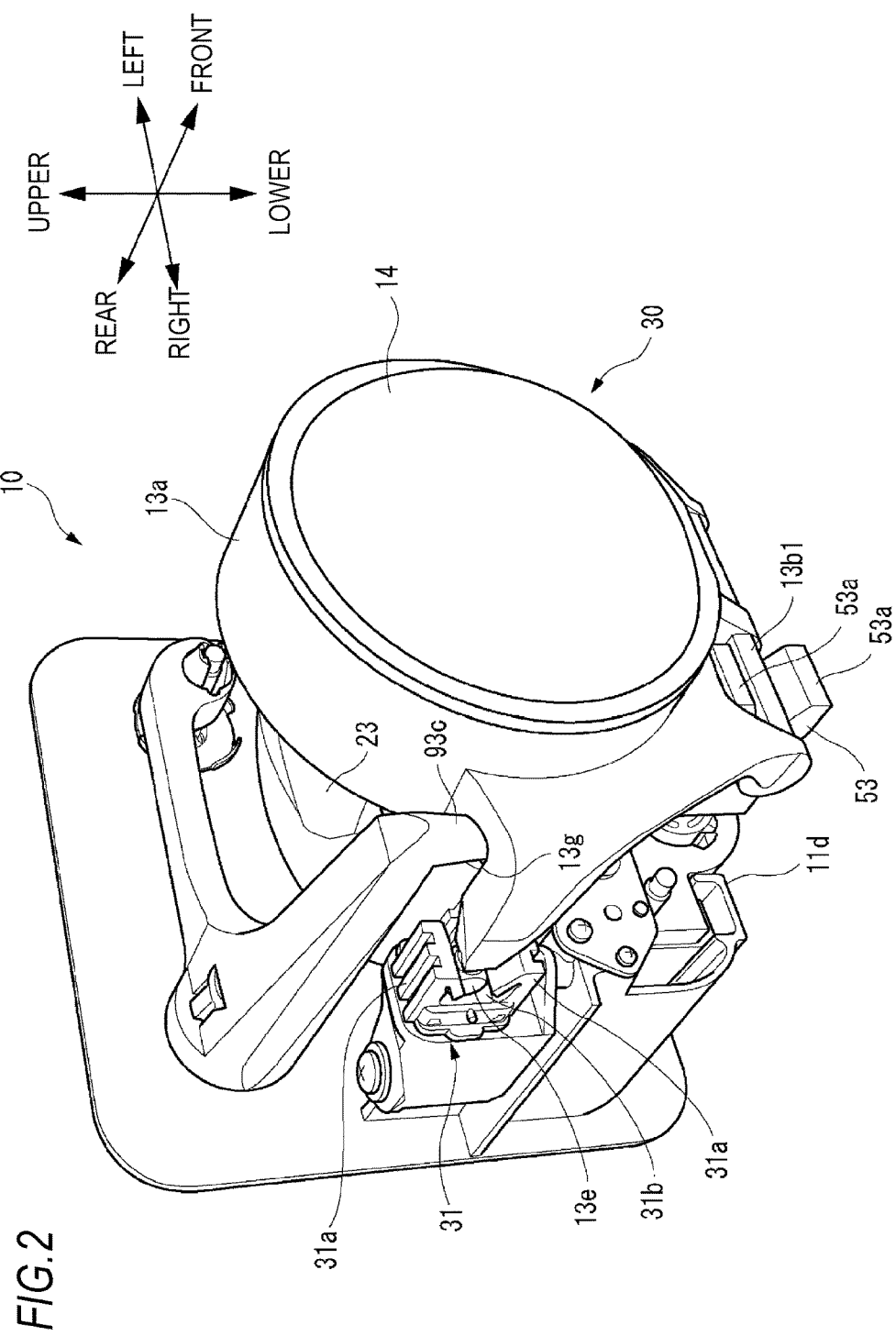
FIG. 2 is a perspective view showing a lamp unit included in the lighting device.

FIG. 2 is a perspective view showing an outer appearance of the lamp unit 10, as seen from the front right upper side. As shown in FIGS. 1 and 2, the lamp unit 10 includes a heat sink 11, a light source unit 12, a lens unit 30, a leveling actuator 15, a light distribution control unit 16, an operation control unit 17, a first aiming mechanism 18, and a second aiming mechanism 19.

Figure 3:
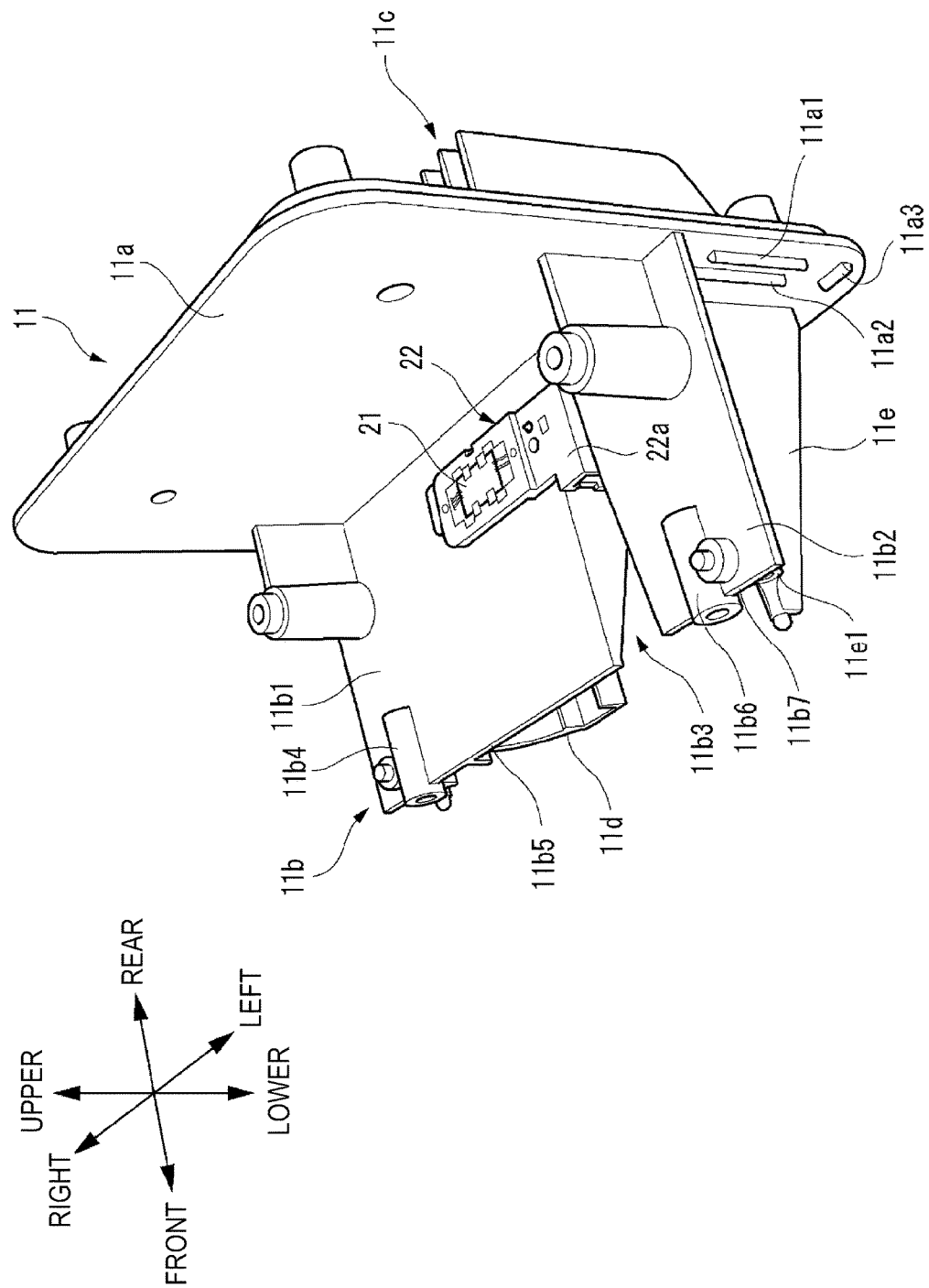
FIG. 3 is a perspective view showing a heat sink and a light source which are included in the lamp unit.

FIG. 3 is a perspective view showing an outer appearance of a portion of the heat sink 11 and the light source unit 12 as seen from the front left upper side. The heat sink 11 includes a rear plate 11a extending in the upper-lower and left-right directions. A support table 11b extends forward on the front side of the rear plate 11a. A plurality of heat dissipation plates 11c are formed on the rear side of the rear plate 11a. Each heat dissipation plate 11c extends in the upper-lower direction.

The support table 11b has a right table 11b1 and a left table 11b2. A cut-out 11b3 extends rearward from a front end of the support table 11b and partitions the right table 11b1 and the left table 11b2. The right table 11b1 is located on the right side of the cut-out 11b3. The left table 11b2 is located on the left side of the cut-out 11b3. A rear end of the cut-out 11b3 is located in front of the rear plate 11a. A rear end of the right table 11b1 is continued to a rear end of the left table 11b2. An actuator accommodating portion 11d is formed below the right table 11b1. A control unit accommodating portion 11e is formed below the left table 11b2.

A right support portion 11b4 is provided on a front end portion of the right table 11b1. The right support portion 11b4 is formed with a hole extending in the front-rear direction. A front end surface of the right support portion 11b4 protrudes forward from a front end edge 11b5 of the right table 11b1. Similarly, a left support portion 11b6 is provided on a front end portion of the left table 11b2. The left support portion 11b6 is formed with a hole extending in the front-rear direction. A front end surface of the left support portion 11b6 protrudes forward from a front end edge 11b7 of the left table 11b2. A lower support portion 11e1 is provided on the portion of the control unit accommodating portion 11e, which is located below the left support portion 11b6. The lower support portion 11e1 is formed with a hole extending in the front-rear direction.

Figure 4:
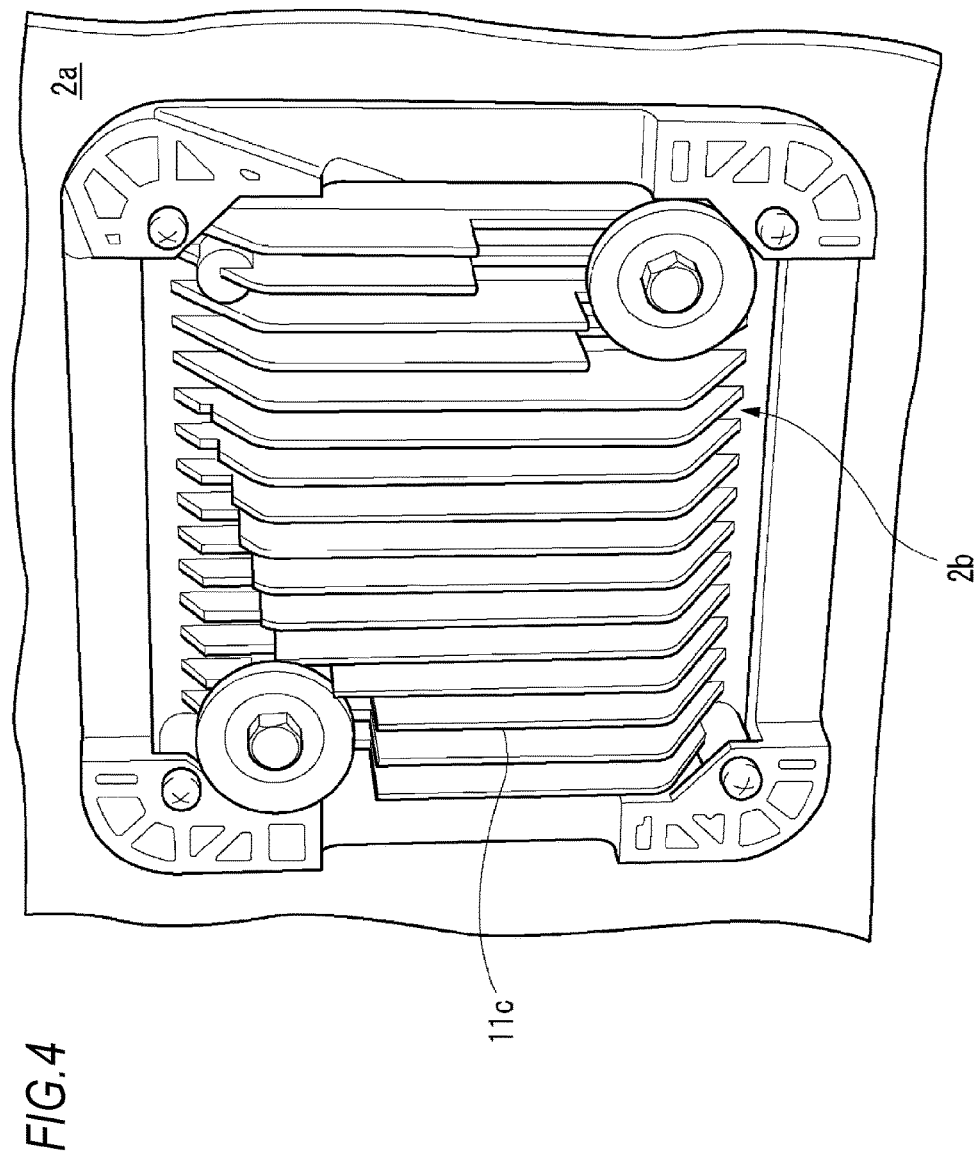
FIG. 4 is a perspective view showing a portion of the rear surface of the lighting device.

As shown in FIG. 1, the lamp unit 10 is assembled to the housing 2 from the inside of the lamp chamber 3. The rear plate 11a of the heat sink 11 faces a rear wall 2a of the housing 2. As shown in FIG. 4, the rear wall 2a is formed with an opening 2b. The portion of the heat sink 11, at which the heat dissipation plates 11c are formed, is penetrated by the opening 2b and is exposed to the outside of the rear wall 2a.

As shown in FIGS. 1 and 3, the light source unit 12 includes a light source 21, an attachment 22 and a reflector 23. As shown in FIG. 3, the light source 21 is fixed to the support table 11b of the heat sink 11 via the attachment 22. As shown in FIGS. 1 and 2, the reflector 23 is also fixed to the support table 11b. A dome-shaped inner surface 23a of the reflector 23 is a reflecting surface and is disposed to face the light source 21.

As shown in FIGS. 1 and 2, the lens unit 30 is disposed in front of the reflector 23. The lens unit 30 includes a lens holder 13 and a projection lens 14. The lens holder 13 has a lens holding portion 13a. The lens holding portion 13a is an annular frame and supports the projection lens 14 on the front surface thereof.

Light emitted from the light source 21 is reflected forward by the inner surface 23a of the reflector 23, and at least a portion thereof passes through the projection lens 14. The light which passes through the projection lens 14 illuminates the front through the translucent cover 4.

As shown in FIG. 1, the leveling actuator 15 includes a case 51, a shaft 52 and a joint 53. As shown in FIG. 2, the leveling actuator 15 is disposed in the actuator accommodating portion 11d of the heat sink 11 such that a tip end of the shaft 52 faces forward. A drive circuit (not shown) provided in the case 51 receives a control signal from the operation control unit 17. The shaft 52 advances and retreats with respect to the case 51 in accordance with the control signal. As shown in FIGS. 1 and 2, the joint 53 connects the shaft 52 and a lower end portion 13b of the lens holder 13.

Figure 5:
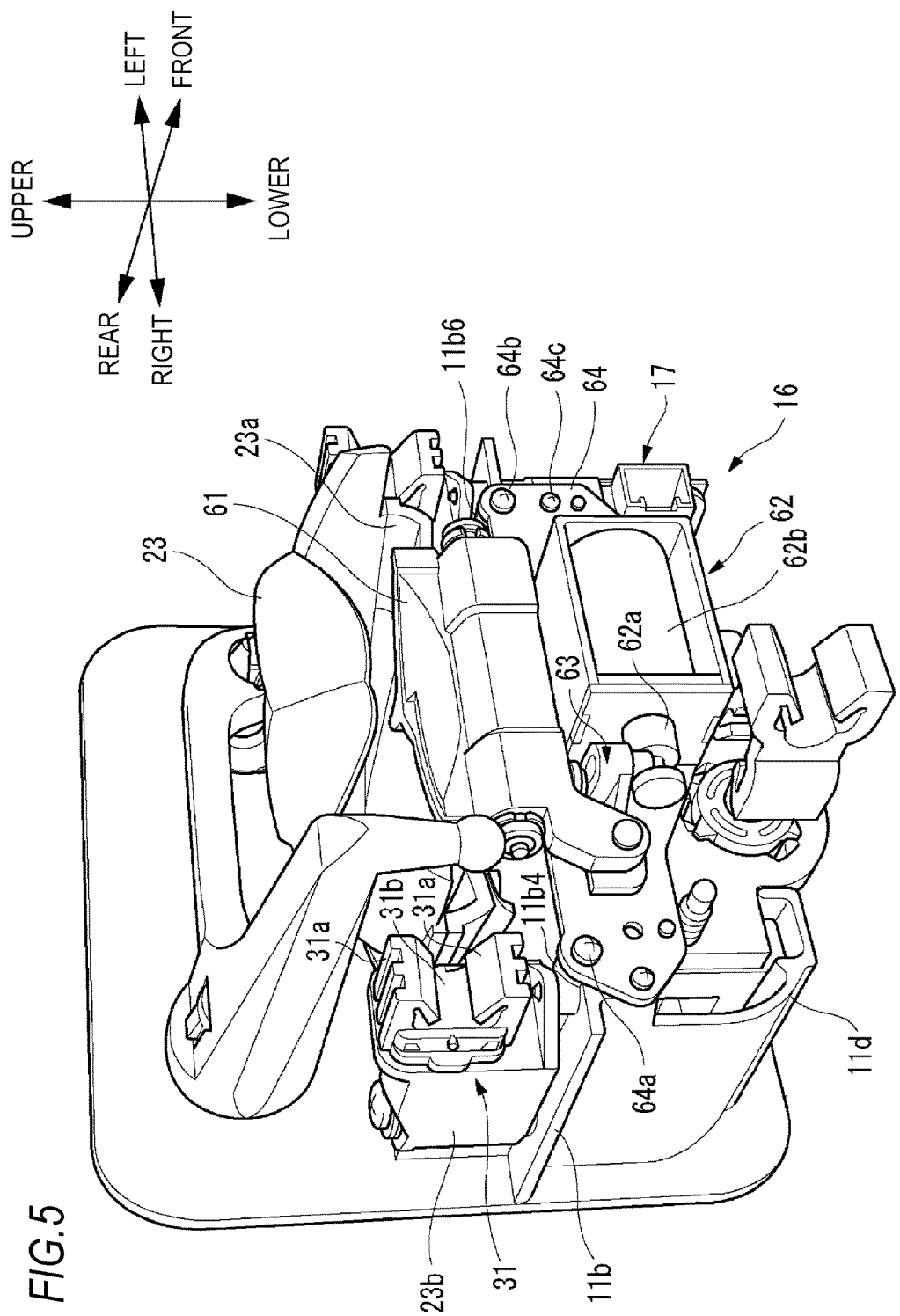
FIG. 5 is a perspective view showing a portion of the lamp unit.

FIG. 5 is a perspective view showing an outer appearance of the lamp unit 10 in the state where the lens holder 13 and the projection lens 14 are detached, as seen from the front right upper side. The light distribution control unit 16 is fixed to a front end of the support table 11b of the heat sink 11. The light distribution control unit 16 includes a movable shade 61, a solenoid 62, a link mechanism 63, and a bracket 64.

The movable shade 61 is disposed slightly in front of a rear focal point of the projection lens 14. Therefore, a portion of the light which is emitted from the light source 21 and reflected by the inner surface 23a of the reflector 23 is blocked by the movable shade 61. As the shape of an upper end edge of the movable shade 61 is inverted and projected forward, a low-beam light distribution pattern is formed in front of a vehicle. The low-beam light distribution pattern has a cut-off line corresponding to the shape of the upper end edge, and a lower portion thereof serves as a lighting area.

A plunger 62a included in the solenoid 62 is connected to the movable shade 61 via the link mechanism 63. As power is supplied to a coil 62b included in the solenoid 62 and the plunger 62a is operated, the movable shade 61 is tilted rearward through the link mechanism 63.

In this way, the upper end edge of the movable shade 61 retreats downward from an optical axis A (see FIG. 1) of the projection lens 14, so that the blocked state of the light emitted from the light source 21 is eliminated. The light, which is emitted from the light source 21 and reflected by the reflector 23, passes through the projection lens 14 to form a high-beam light distribution pattern for illuminating a wide range of the front of a vehicle to a far distance.

The bracket 64 is a plate-like member for supporting the movable shade 61, the solenoid 62 and the link mechanism 63. Through-holes are respectively formed at the positions of the bracket 64, which correspond to the right support portion 11b4 and the left support portion 11b6 of the heat sink 11 shown in FIG. 3. Fixing members 64a, 64b such as screws are fitted into holes respectively formed on the right support portion 11b4 and the left support portion 11b6 through respective though-holes, so that the light distribution control unit 16 is fixed to the support table 11b of the heat sink 11.

Figure 6:
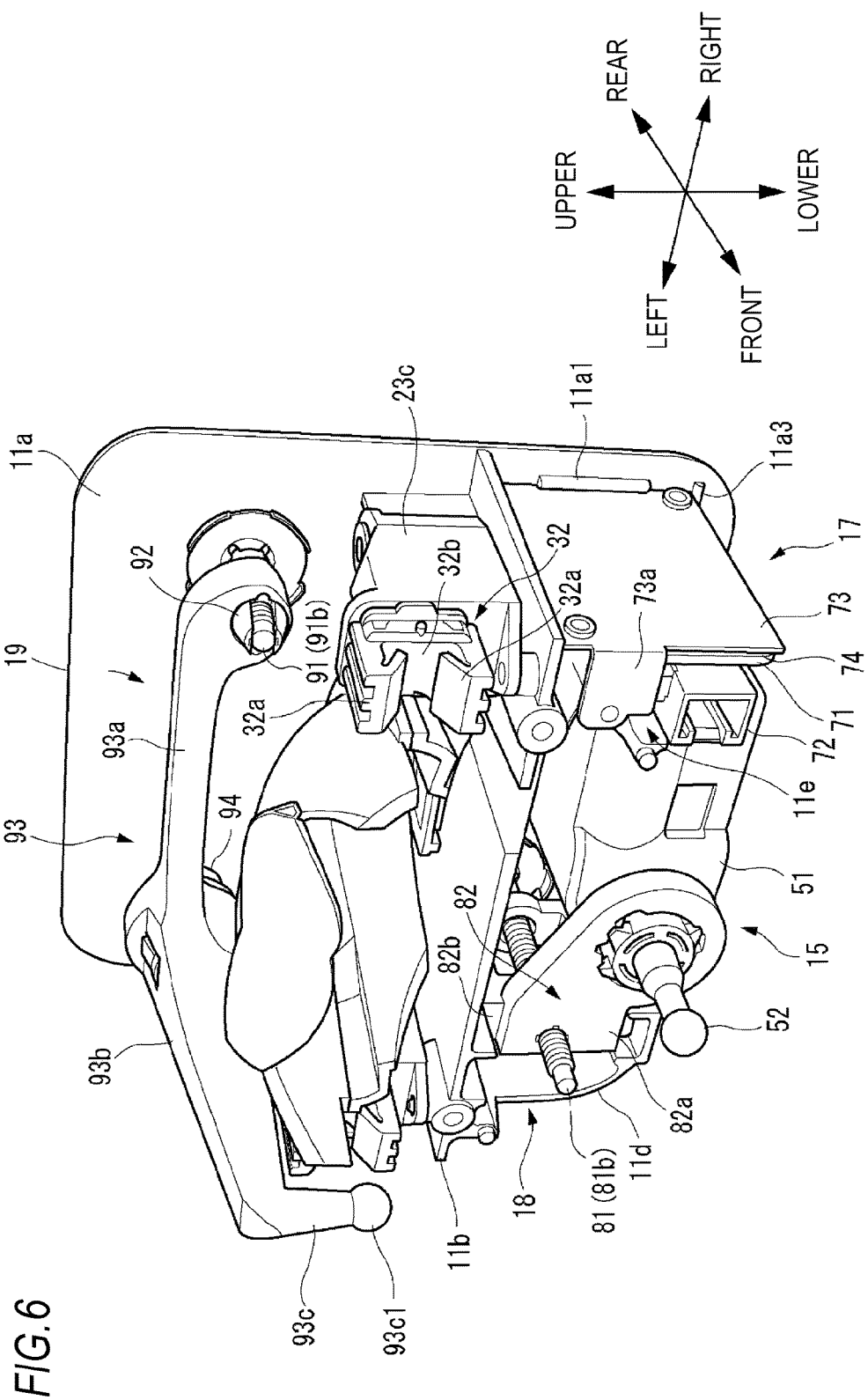
FIG. 6 is a perspective view showing a portion of the lamp unit.

FIG. 6 is a perspective view showing an outer appearance of the lamp unit 10 in the state where the light distribution control unit 16 and the joint 53 of the leveling actuator 15 are additionally detached from the configuration shown in FIG. 5, as seen from the front left upper side. The operation control unit 17 is disposed in the control unit accommodating portion 11e of the heat sink 11.

Figure 7:
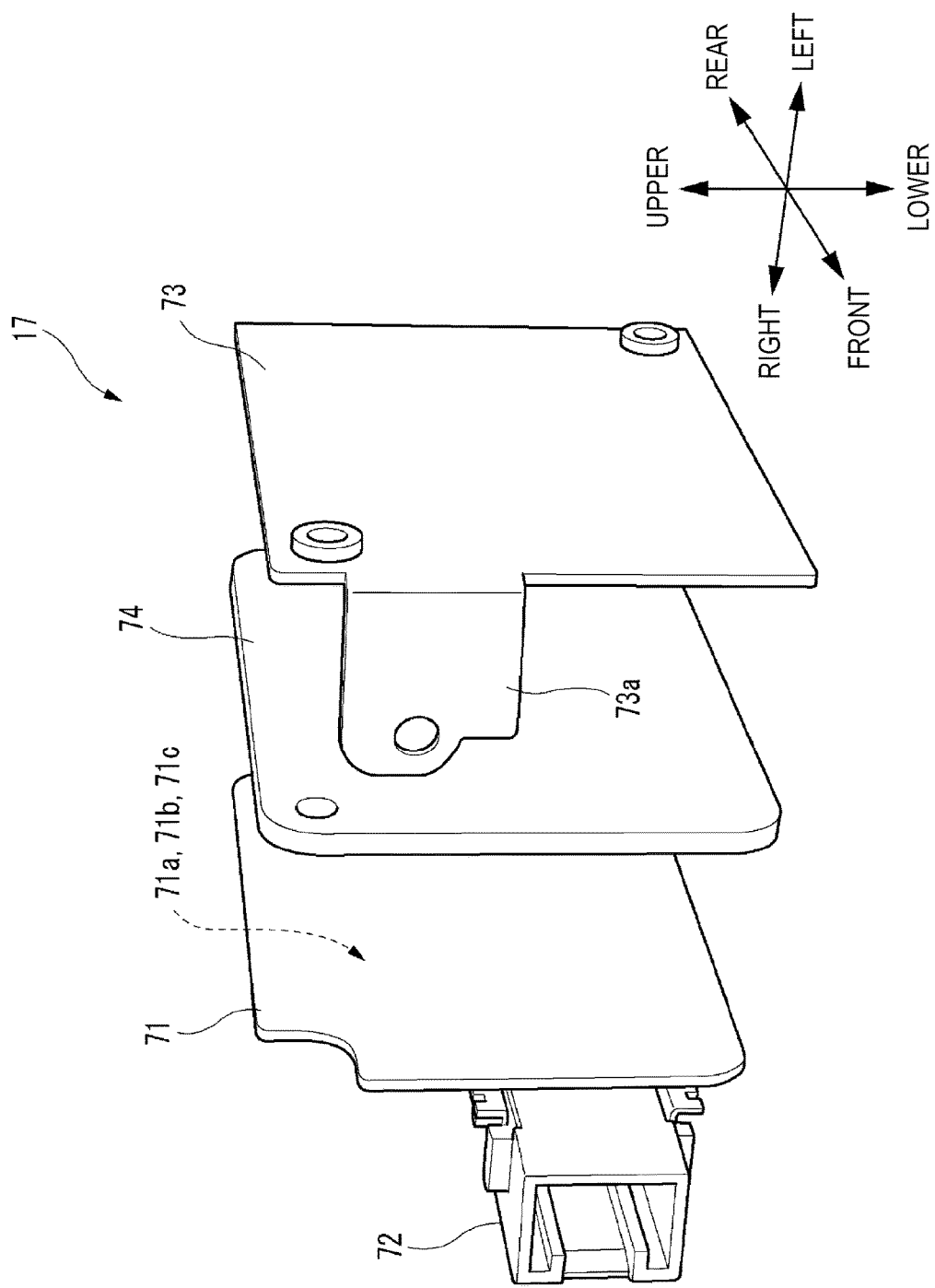
FIG. 7 is an exploded perspective view showing an operation control unit included in the lamp unit.

FIG. 7 is an exploded perspective view showing a configuration of the operation control unit 17. The operation control unit 17 includes a circuit board 71, a connector 72, a fixing plate 73 and a heat transfer sheet 74. The operation control unit 17 is disposed in the control unit accommodating portion 11e such that a main surface of the circuit board 71 extends in the upper-lower direction.

The circuit board 71 includes a first control circuit 71a for controlling at least an on/off operation of the light source 21 of the light source unit 12, a second control circuit 71b for controlling an advance and retreat operation of the shaft 52 of the leveling actuator 15, and a third control circuit 71c for controlling an operation of the solenoid 62 of the light distribution control unit 16. The connector 72 is fixed on the circuit board 71 and is electrically connected to these control circuits 71*a*, 71*b*, 71*c*. Further, the connector 72 is electrically connected to an integrated control part (such as ECU) provided in a vehicle side by a signal line (not shown).

Further, the connector 72 is electrically connected to a connector portion 22*a* included in the attachment 22 shown in FIG. 3 via a signal line (not shown). A conductive bus bar (not shown) is provided inside the attachment 22. A control signal, which is outputted from the first control circuit 71*a* according to the instructions from the integrated control part, is inputted to the light source 21 via the connector 72, the connector portion 22*a* of the attachment 22, and the bus bar. In this way, an operation of the light source 21 corresponding to the control signal is implemented.

Further, the connector 72 is electrically connected to a drive circuit provided in the case 51 of the leveling actuator 15 via a signal line (not shown). A control signal, which is outputted from the second control circuit 71*b* according to the instructions from the integrated control part, is inputted to the drive circuit in the case 51 via the connector 72. In this way, an operation of the shaft 52 corresponding to the control signal is implemented.

Further, the connector 72 is electrically connected to a drive circuit provided in the solenoid 62 of the light distribution control unit 16 via a signal line (both the drive circuit and the signal line are not shown). A control signal, which is outputted from the third control circuit 71*c* according to the instructions from the integrated control part, is inputted to the drive circuit of the solenoid 62 via the connector 72. In this way, an operation of the solenoid 62 corresponding to the control signal is implemented.

The heat transfer sheet 74 is a member made of high-thermal conductive material such as silicone or acrylic and transfers heat generated in the control circuit to the fixing plate 73. The heat transfer sheet 74 can be replaced with heat transfer grease.

The fixing plate 73 is a member made of material which has high thermal conductivity and suitable rigidity, such as aluminum. A fixing piece 73*a* is provided in the front end portion of the fixing plate 73. The fixing piece 73*a* is formed with a through-hole. As shown in FIG. 6, the fixing piece 73*a* is disposed such that the through-hole faces a hole formed in the lower support portion 11*e*1 (see FIG. 3) of the heat sink 11. Further, the bracket 64 of the light distribution control unit 16 shown in FIG. 5 has a through-hole at a position corresponding to the through-hole. A fixing member 64*c* such as a screw is fitted into the hole formed in the lower support part 11*e*1 through these through-holes such that the operation control unit 17 is fixed to the control unit accommodating portion 11*e*. At this time, the heat transfer sheet 74 is sandwiched between the circuit board 71 and the fixing plate.

Further, as shown in FIG. 3, a first rib 11*a*1, a second rib 11*a*2 and a third rib 11*a*3 are formed on the front surface of the rear plate 11*a* in the control unit accommodating portion 11*e* of the heat sink 11. The first rib 11*a*1 and the second rib 11*a*2 extend in the upper-lower direction. The third rib 11*a*3 extends in the left-right direction on the lower side of the first rib 11*a*1 and the second rib 11*a*2. As shown in FIG. 6, the operation control unit 17 is disposed in a region defined by the first rib 11*a*1, the second rib 11*a*2 and third rib 11*a*3, and a position in the left-right direction and the upper-lower direction thereof is restricted. In this way, the position of the operation control unit 17 is stabilized against the vibration from the outside.

Figure 8:
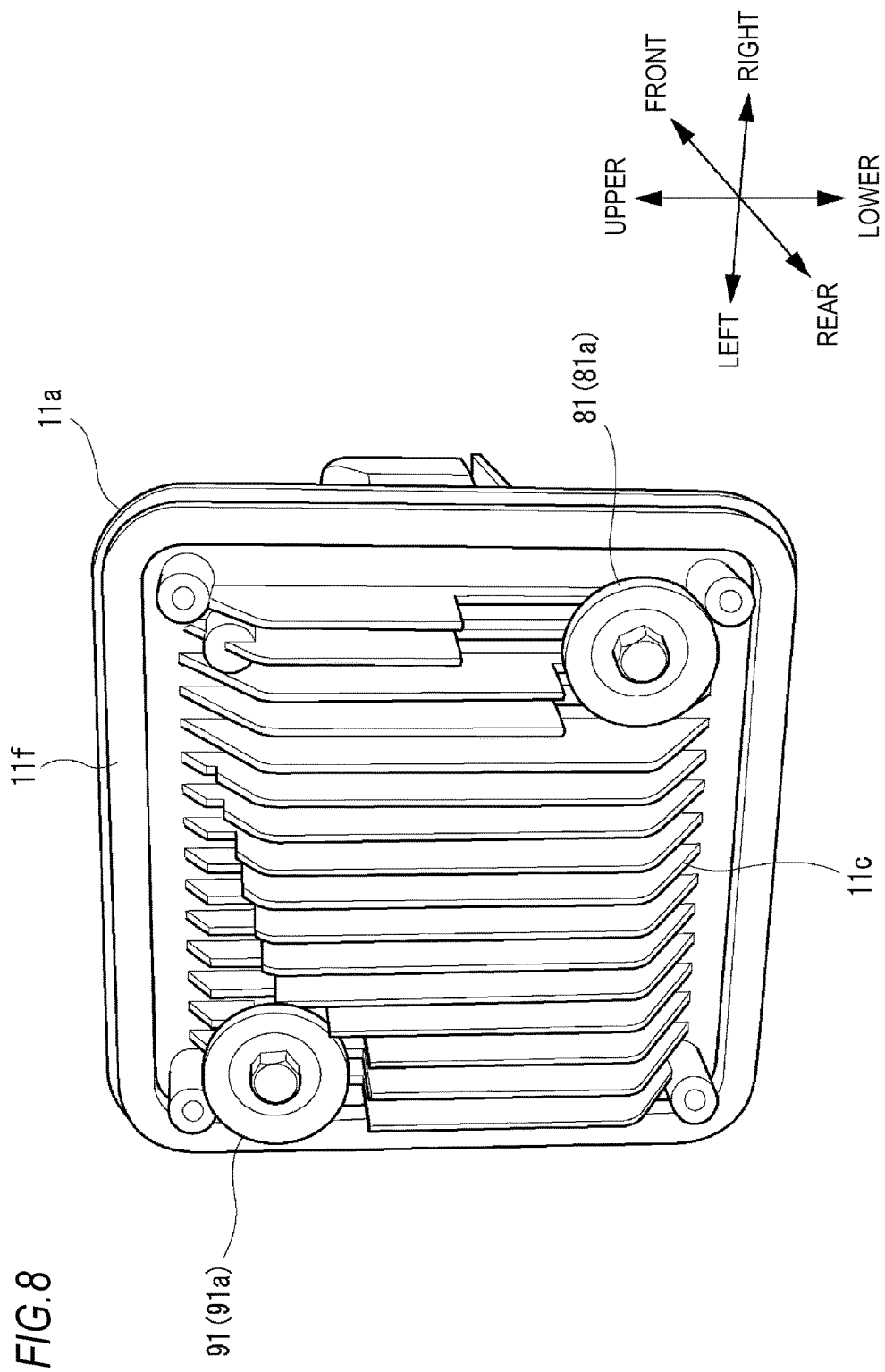
FIG. 8 is a perspective view showing the rear surface of the lamp unit.

FIG. 8 is a perspective view showing an outer appearance of the lamp unit 10 as seen from the rear left side. An annular gasket 11*f* extending along a peripheral edge of the rear plate 11*a* is mounted on the rear surface side of the heat sink 11. As shown in FIG. 1, the housing 2 has an annular frame wall 2*c* protruding forward from an inner surface of the rear wall 2*a*. When assembling the lamp unit 10 to the housing 2, the gasket 11*f* is accommodated in the frame wall 2*c* and prevents moisture or dust from entering into the lamp chamber 3 through the opening 2*b*. The gasket 11*f* can be replaced with a gel-like sealing member.

As shown in FIGS. 6 and 8, the first aiming mechanism 18 includes a first screw 81 and a joint 82. The first screw 81 has a head portion 81*a* and a shaft portion 81*b*. As shown in FIG. 8, the head portion 81*a* is disposed on a rear surface side of the lower right portion of the rear plate 11*a* of the heat sink 11. As shown in FIG. 6, the shaft portion 81*b* penetrates through the rear plate 11*a* of the heat sink 11 and extends forward. A threaded groove is formed on an outer peripheral surface of the shaft portion 81*b*.

The joint 82 has a coupling portion 82*a* and a slider portion 82*b*. A right end portion of the coupling portion 82*a* is integrally continued to a front end portion of the slider portion 82*b*. The slider portion 82*b* has an insertion hole which is formed at its inner peripheral surface with a threaded groove. As shown in FIG. 6, the shaft portion 81*b* of the first screw 81 is inserted through the insertion hole formed in the slider portion 82*b*, and threaded grooves thereof are screwed with each other.

When the head portion 81*a* of the first screw 81 is rotationally operated by a tool (not shown), the screwed position of the shaft portion 81*b* and the joint 82 is changed, and the joint 82 is moved in the front-rear direction. Since the joint 82 is coupled with the case 51 of the leveling actuator 15, the leveling actuator 15 is also moved in the front-rear direction in accordance with the rotation of the first screw 81.

The second aiming mechanism 19 includes a second screw 91, a joint 92, a link 93, and a fulcrum member 94. The second screw 91 has a head portion 91*a* and a shaft portion 91*b*.

As shown in FIG. 8, the head portion 91*a* is disposed on a rear surface side of the upper left portion of the rear plate 11*a* of the heat sink 11. As shown in FIG. 6, the shaft portion 91*b* penetrates through the rear plate 11*a* of the heat sink 11 and extends forward. A threaded groove is formed on an outer peripheral surface of the shaft portion 91*b*. The joint 92 includes a pair of clamping pieces in which a threaded groove is respectively formed on opposite surfaces. The shaft portion 91*b* of the second screw 91 is clamped from the upper-lower direction by the pair of clamping pieces, so that the threaded grooves of the clamping pieces are screwed with the threaded groove of the shaft portion 91*b*.

As shown in FIGS. 5 and 6, the link 93 has a first portion 93*a* extending in the left-right direction, a second portion 93*b* extending in the front-rear direction, and a third portion 93*c* extending in the upper-lower direction. A left end portion of the first portion 93*a* is connected to the joint 92. A rear end portion of the second portion 93*b* is connected to the fulcrum member 94. The fulcrum member 94 is provided on a front surface of an upper right portion of the rear plate 11*a* of the heat sink 11. The left end portion of the first portion 93*a* is integrally continued to the rear end portion of the second portion 93*b*. A front end portion of the second portion 93*b* is integrally continued to an upper end portion of the third portion 93*c*.

As shown in FIG. 5, on the right side of the reflector 23, a right arm portion 23b is formed and a right bearing 31 is mounted thereon. The right bearing 31 has a pair of clamping pieces 31a arranged in the upper-lower direction. A fitting groove 31b extending in the left-right direction is formed between the pair of clamping pieces 31a. As shown in FIG. 6, on the left side of the reflector 23, a left arm portion 23c is formed and a left bearing 32 is mounted thereon. The left bearing 32 has a pair of clamping pieces 32a arranged in the upper-lower direction. A fitting groove 32b extending in the left-right direction is formed between the pair of clamping pieces 32a.

Figure 9:
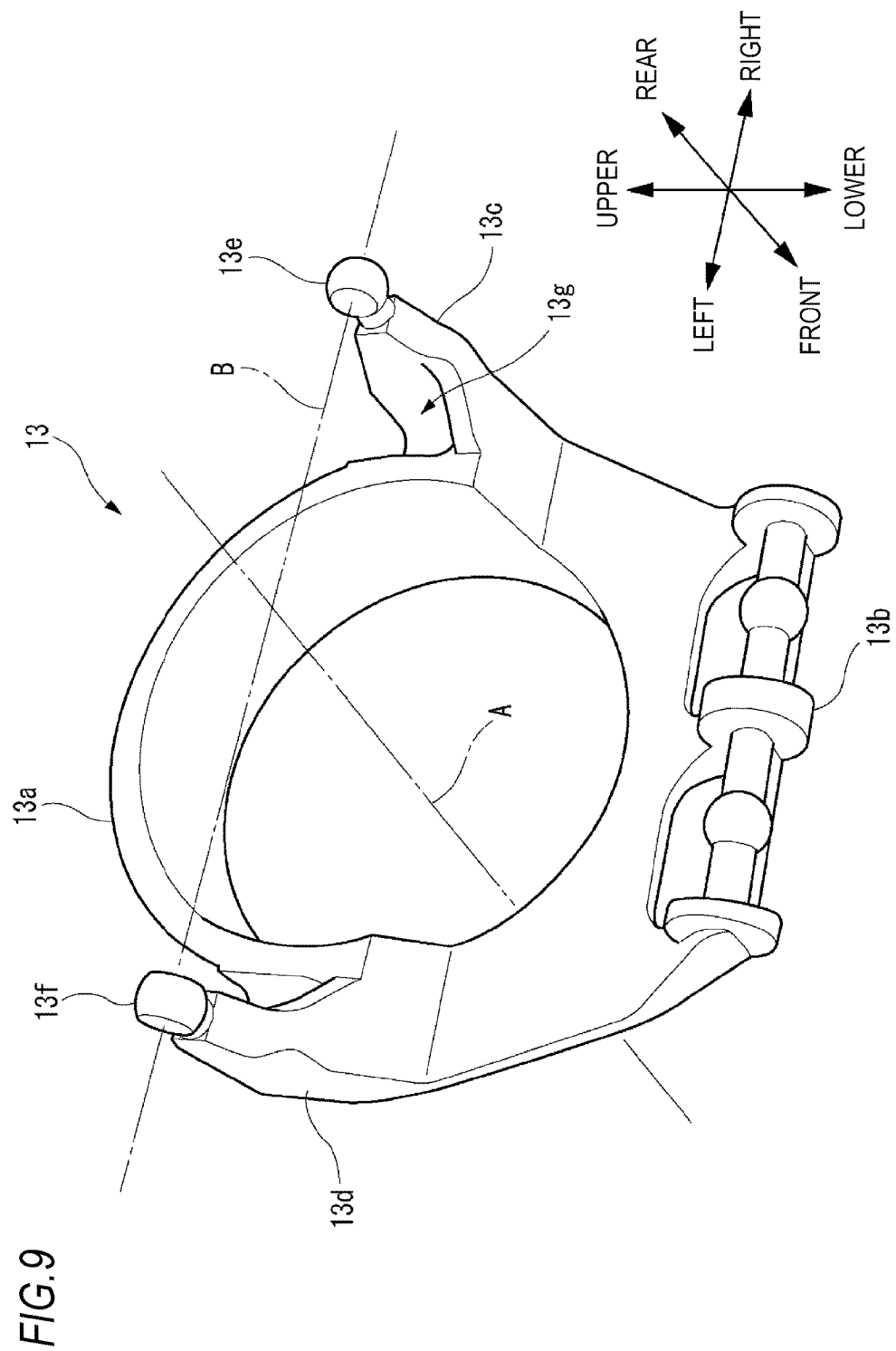
FIG. 9 is a perspective view showing a lens holder included in the lamp unit.

FIG. 9 is a perspective view of the lens holder 13 as seen from the rear lower side. The lens holder 13 further has a right arm portion 13c, a left arm portion 13d, a right shaft portion 13e, a left shaft portion 13f, and a fitting groove 13g.

The right arm portion 13c extends rearward from a right portion of the lens holding portion 13a. The left arm portion 13d extends rearward from a left portion of the lens holding portion 13a. The right shaft portion 13e is provided at a rear end of the right arm portion 13c. The left shaft portion 13f is provided at a rear end of the left arm portion 13d. The fitting groove 13g is formed between the right portion of the lens holding portion 13a and the right arm portion 13c, and extends in the upper-lower direction.

The right shaft portion 13e and the left shaft portion 13f have a substantially spherical shape, respectively. The right shaft portion 13e and the left shaft portion 13f are disposed such that a reference axis B connecting two shaft portions is perpendicular to the optical axis A of the projection lens 14 mounted on the lens holding portion 13a and intersects with a rear focal point of the projection lens 14. In other words, the reference axis B is perpendicular to the optical axis A and located on a plane which intersects with the rear focal point of the projection lens 14.

When the lens holder 13 is mounted as shown in FIG. 2, the third portion 93c of the link 93 of the second aiming mechanism 19 is fitted into the fitting groove 13g. At this time, a tip end portion 93c1 (see FIG. 6) of the third portion 93c is disposed at the same position as the right shaft portion 13e of the lens holder 13 in the upper-lower direction, and is abutted against an inner wall of the fitting groove 13g.

The right shaft portion 13e of the lens holder 13 is fitted to the right bearing 31. Specifically, the right shaft portion 13e is fitted into the fitting groove 31b and is clamped by the pair of clamping pieces 31a. In the fitting groove 31b, the right shaft portion 13e is allowed to rotate around the axis B shown in FIG. 9 and to move in the left-right direction.

A front end portion of the joint 53 included in the leveling actuator 15 has a pair of clamping pieces 53a arranged in the upper-lower direction. Meanwhile, a rotation shaft 13b1 extending in the left-right direction is formed on the lower end portion 13b of the lens holder 13. The rotation shaft 13b1 is rotatably clamped between the clamping pieces 53a.

As shown in FIG. 1, the left shaft portion 13f of the lens holder 13 is fitted to the left bearing 32. Specifically, the left shaft portion 13f is fitted into the fitting groove 32b and is clamped by the pair of clamping pieces 32a. In the fitting groove 32b, the left shaft portion 13f is allowed to rotate around the axis B shown in FIG. 9 and to move in the left-right direction.

Figure 10B:
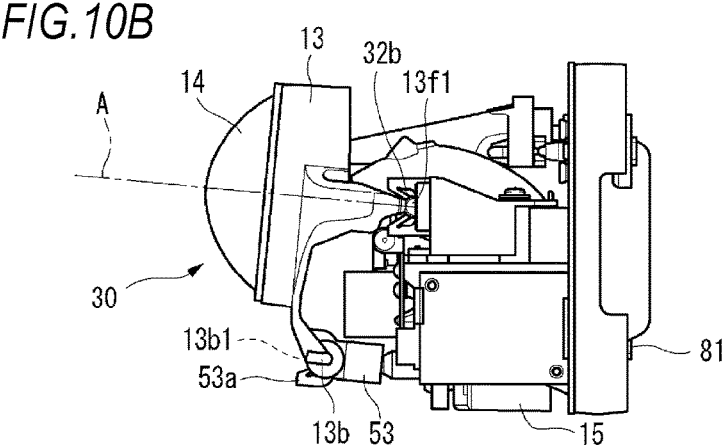
FIGS. 10A to 10C are left side views showing an operation of a first aiming mechanism included in the lamp unit.
Figure 10A:
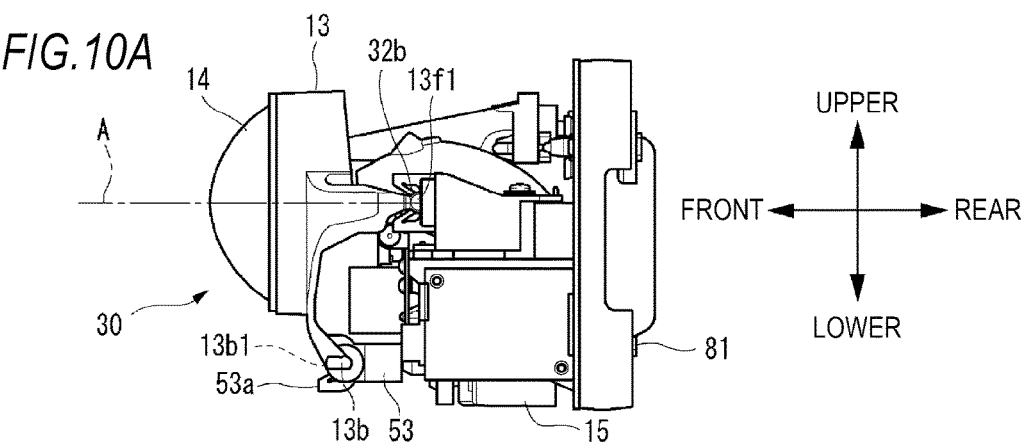

FIG. 10 is a left side view for explaining the movement of each part of the lamp unit 10 in accordance with the rotation of the first screw 81. The operation control unit 17 is not shown. FIG. 10A shows an initial state.

When the first screw 81 is rotated to the left from the above state, the leveling actuator 15 is pushed forward. Consequently, the lower end portion 13b of the lens holder 13 is pushed forward via the joint 53. At this time, the right shaft portion 13e and the left shaft portion 13f are respectively rotated in a clockwise direction (as seen from the left) in the fitting grooves 31b, 32b of the right bearing 31 and the left bearing 32. Consequently, the rotation shaft 13b1 of the lens holder 13 is rotated rearward between the clamping pieces 53a of the joint 53. Accordingly, as shown in FIG. 10B, the optical axis A of the projection lens 14 is tilted upward.

Figure 10C:
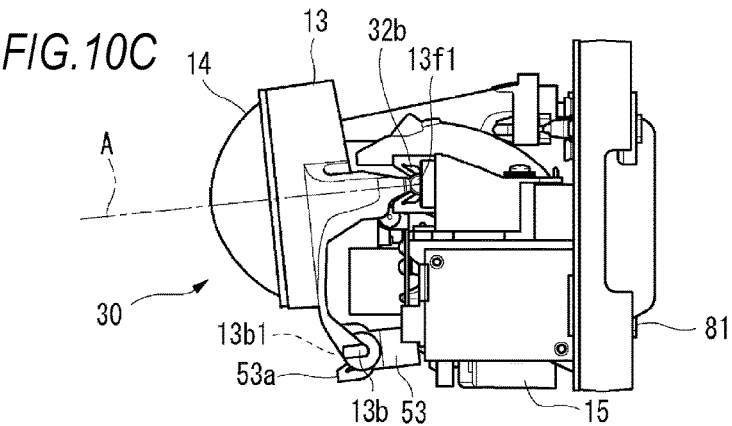

On the other hand, when the first screw 81 is rotated to the right, the leveling actuator 15 is pushed rearward. Consequently, the lower end portion 13b of the lens holder 13 is pushed rearward via the joint 53. At this time, the right shaft portion 13e and the left shaft portion 13f are respectively rotated in a counter-clockwise direction (as seen from the left) in the fitting grooves 31b, 32b of the right bearing 31 and the left bearing 32. Consequently, the rotation shaft 13b1 of the lens holder 13 is rotated forward between the clamping pieces 53a of the joint 53. Accordingly, as shown in FIG. 10C, the optical axis A of the projection lens 14 is tilted downward.

That is, as the head portion 81a of the first screw 81 is operated, a reference position of the leveling actuator 15, i.e., a reference position in the upper-lower direction of the optical axis A of the projection lens 14 is adjusted.

Figure 11C:
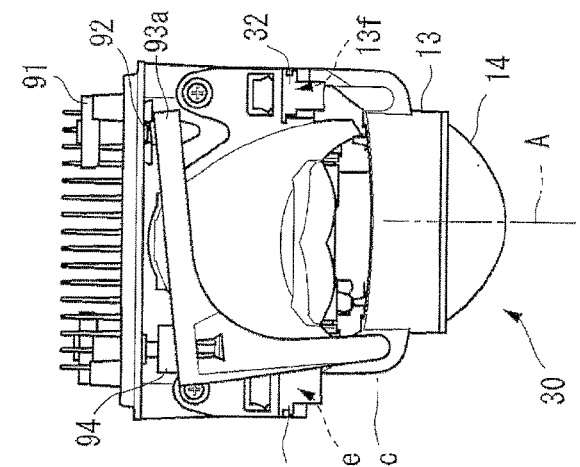
FIGS. 11A to 11C are top views showing an operation of a second aiming mechanism included in the lamp unit.
Figure 11A:
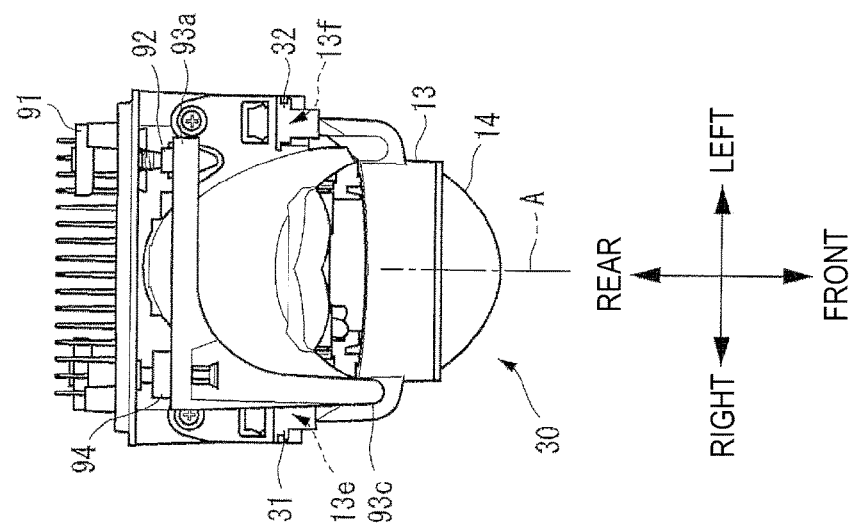

FIG. 11 is a top view for explaining the movement of each part of the lamp unit 10 in accordance with the rotation of the second screw 91. The operation control unit 17 is not shown. FIG. 11A shows an initial state.

Figure 11B:
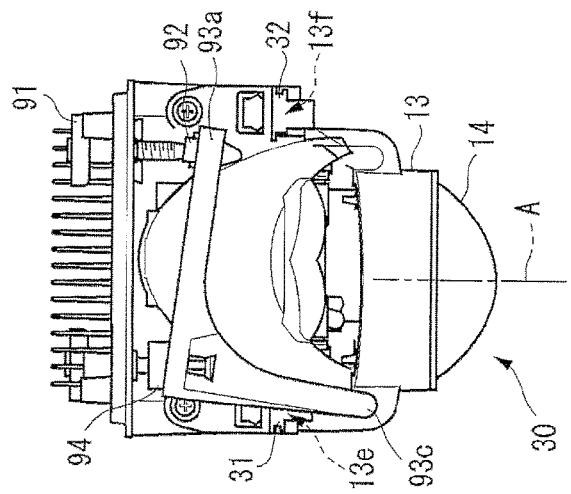

When the second screw 91 is rotated to the left from the above state, the first portion 93a of the link 93 is pushed forward via the joint 92. Consequently, the link 93 is rotated to the right with the fulcrum member 94 as a rotation axis, and the right arm portion 13c of the lens holder 13 is pushed to the right via the third portion 93c. At this time, the right shaft portion 13e and the left shaft portion 13f are respectively moved to the right in the fitting grooves 31b, 32b of the right bearing 31 and the left bearing 32. Accordingly, as shown in FIG. 11B, the optical axis A of the projection lens 14 which is a portion of the lamp unit 30 is translated to the right.

On the other hand, when the second screw 91 is rotated to the right, the first portion 93a of the link 93 is pushed rearward via the joint 92. Consequently, the link 93 is rotated to the left with the fulcrum member 94 as a rotation axis, and the right arm portion 13c of the lens holder 13 is pushed to the left via the third portion 93c. At this time, the right shaft portion 13e and the left shaft portion 13f are respectively moved to the left in the fitting grooves 31b, 32b of the right bearing 31 and the left bearing 32. Accordingly, as shown in FIG. 11C, the optical axis A of the projection lens 14 which is a portion of the lamp unit 30 is translated to the left.

That is, as the head portion 91a of the second screw 91 is operated, a reference position in the left-right direction of the optical axis A of the projection lens 14 is adjusted.

The leveling actuator 15 is a mechanism for changing a direction of the optical axis A of the projection lens 14 in the upper-lower direction of the vehicle depending on the change in the vehicle due to the number of passengers and the loading of luggage. FIG. 12A shows a state (the same state as FIG. 10C) where the optical axis A of the projection lens 14 is somewhat tilted downward by the operation of the first screw 81. FIG. 12B shows a state where the leveling actuator 15 is operated from the state shown in FIG. 12A and thus the shaft 52 is pulled rearward.

As the shaft 52 is pulled, the lower end portion 13b of the lens holder 13 is further pulled rearward via the joint 53. At this time, the right shaft portion 13e and the left shaft portion 13f are further rotated in the counter-clockwise direction (as seen from the left) in the fitting grooves 31b, 32b of the right bearing 31 and the left bearing 32, respectively. Consequently, the rotation shaft 13b1 is further rotated in the counter-clockwise direction (as seen from the left) between the clamping pieces 53a of the joint 53. Accordingly, the optical axis A of the projection lens 14 is further tilted downward.

That is, since the shaft 52 of the leveling actuator 15 further advances and retreats with reference to the position of the optical axis A of the projection lens 14, which is adjusted by the operation of the first screw 81 and the second screw 91, the optical axis A can be moved in the upper-lower direction.

Figure 13:
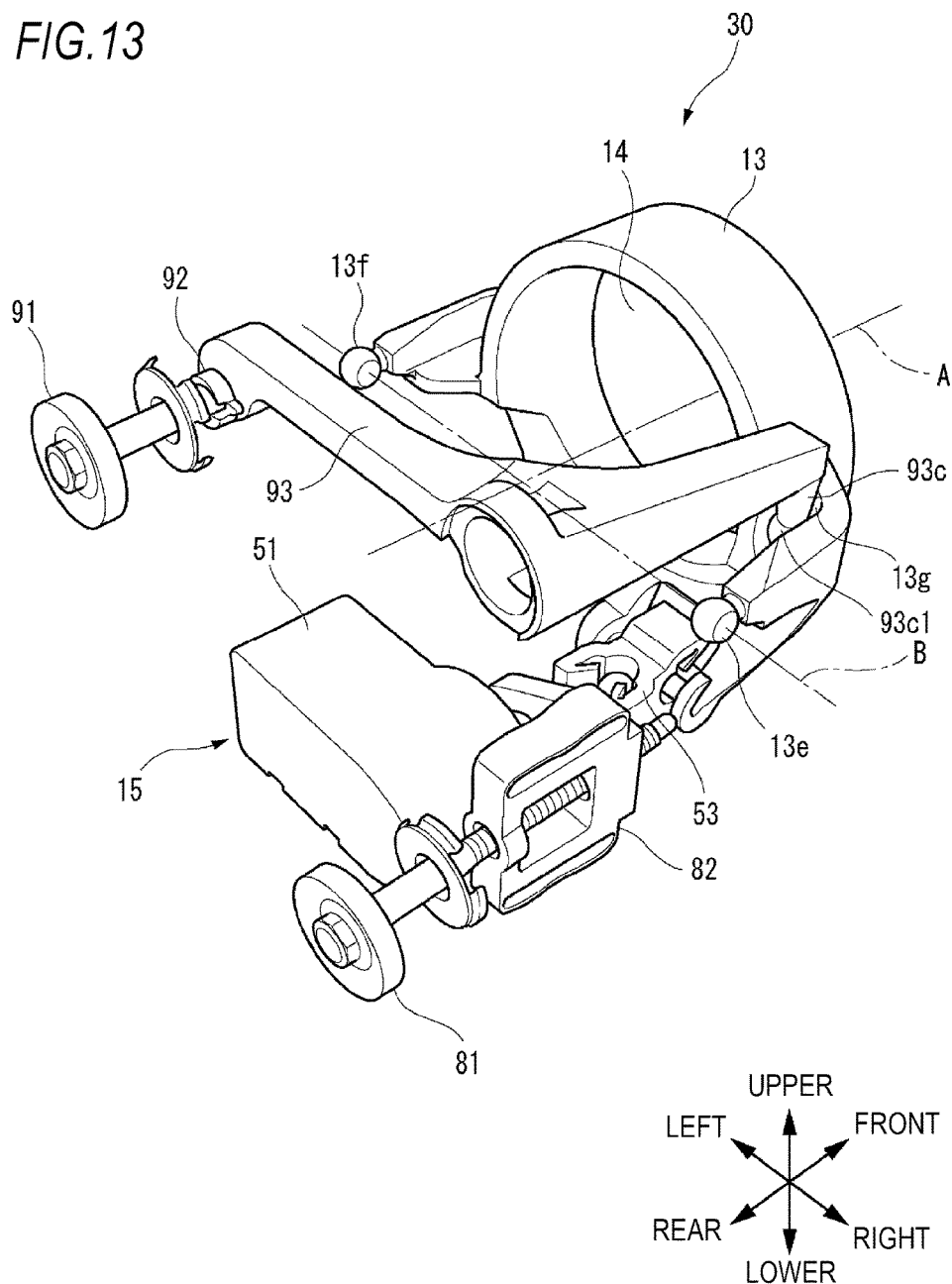
FIG. 13 is a perspective view showing a portion of the lamp unit.

Hereinafter, an additional detailed configuration of the headlamp device 1 configured and operated as described above will be described. FIG. 13 is a perspective view showing a part of the lamp unit 10, especially, an element serving as an adjustment mechanism for adjusting the reference position of the optical axis A.

The right shaft portion 13e and the left shaft portion 13f of the lens holder 13 respectively form a portion of the reference axis B. The right bearing 31 and the left bearing 32 hold the right shaft portion 13e and the left shaft portion 13f, respectively. The right shaft portion 13e and the left shaft portion 13f are disposed such that the reference axis B is perpendicular to the optical axis A of the projection lens 14 (not shown) and located on a plane which intersects with a rear focal point F of the projection lens 14.

The rotation of the first screw 81 is converted into the front-rear movement of the joint 82 coupled to the case 51 of the leveling actuator 15, thereby rotating the lens unit 30 in the front-rear direction via the joint 53 (an example of a first transmission mechanism). Specifically, the rotation action of the first screw 81 is applied to the right shaft portion 13e and the left shaft portion 13f, which are, in turn, rotated about the reference axis B in the fitting grooves 31b, 32b of the right bearing 31 and the left bearing 32. In this way, the reference position in the upper-lower direction (an example of a first direction) of the optical axis A is adjusted.

The rotation of the second screw 91 is converted into the front-rear movement of the joint 92, thereby moving the lens unit 30 in the left-right direction via the third portion 93c of the link 93 (an example of a second transmission mechanism). Specifically, the rotation action of the second screw 91 is applied to the right shaft portion 13e and the left shaft portion 13f, which are, in turn, moved in an extension direction of the reference axis B in the fitting grooves 31b, 32b of the right bearing 31 and the left bearing 32. In this way, the reference position in the left-right direction (an example of a second direction) of the optical axis A is adjusted. Accordingly, the tip end portion 93c1 of the third portion 93c inserted into the fitting groove 13g formed in the lens holder 13 is an acting point of the second aiming mechanism 19 to the right shaft portion 13e and the left shaft portion 13f.

According to such a configuration, the rotation action of the first screw 81 and the second screw 91 for adjusting the reference position of the optical axis A for different intersecting directions can be applied integrally in the lens unit 30 having the common reference axis B. Especially, the number of parts and the occupying space of the parts can be reduced as compared to the configuration where the rotation action of each screw is applied to a mechanism having different axis. Accordingly, it is possible to reduce the occupying space of the lamp unit 10 including a mechanism for adjusting the reference position of the optical axis A.

The right shaft portion 13e and the left shaft portion 13f are rotated about the reference axis B in accordance with the rotation of the first screw 81 and are moved in the extension direction of the reference axis B in accordance with the rotation of the second screw 91. Here, the reference axis B is perpendicular to the optical axis A and located on a plane which intersects with the rear focal point F of the projection lens 14. Accordingly, a relative position between the rear focal point F and the light source 21 is not changed. As a result, the influence of an operation of adjusting the reference position of the optical axis A on the light distribution by the lamp unit 10 can be suppressed.

The tip end portion 93c1 (an example of an acting point of a second transmission mechanism) is an acting point to which the rotation action of the second screw is applied, and is disposed on a plane which is formed by the optical axis A and the reference axis B. Effects of this configuration will be described with reference to a comparative example.

Figure 14:
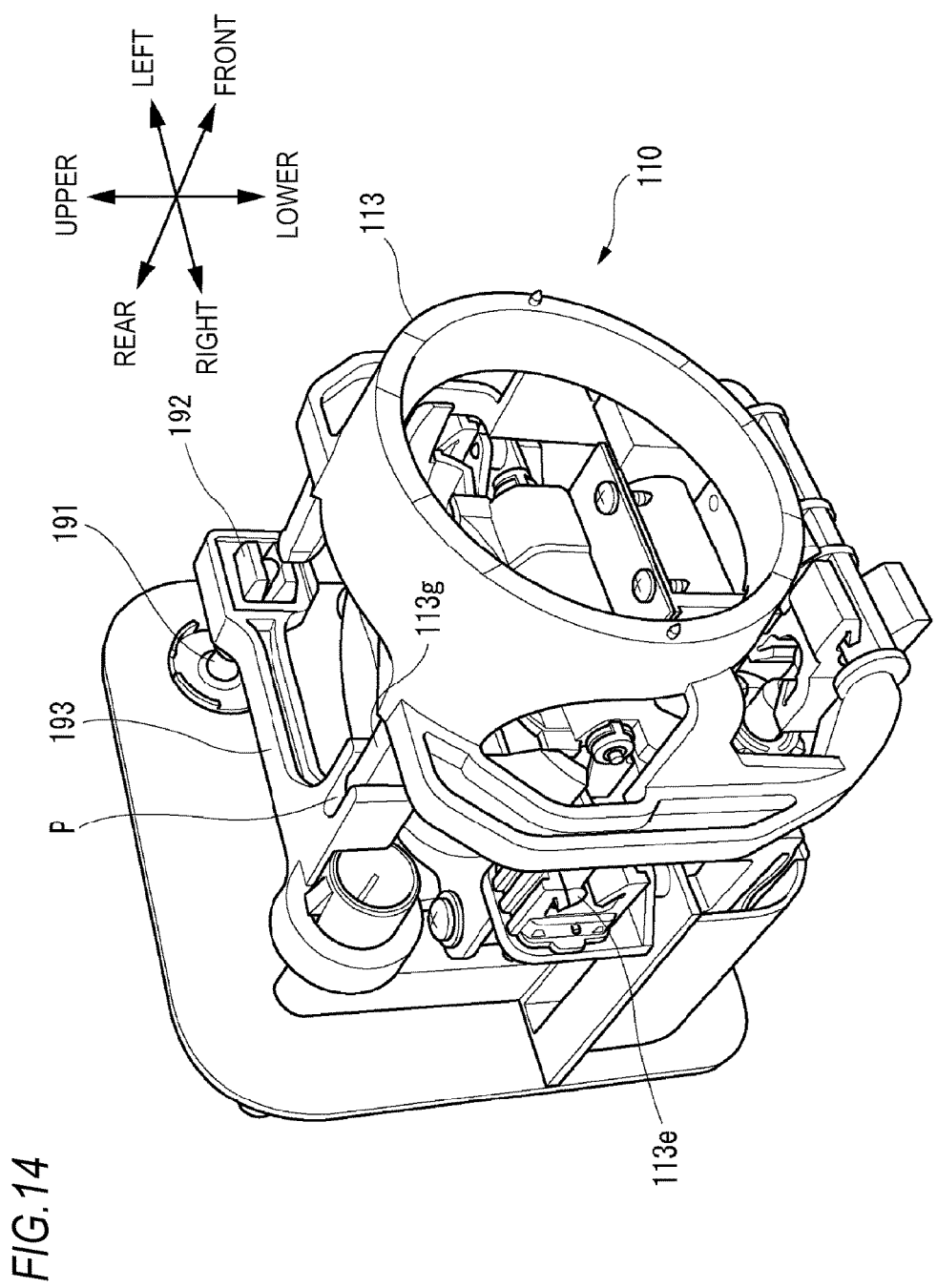
FIG. 14 is a perspective view showing a lamp unit according to a comparative example.
Figure 15:
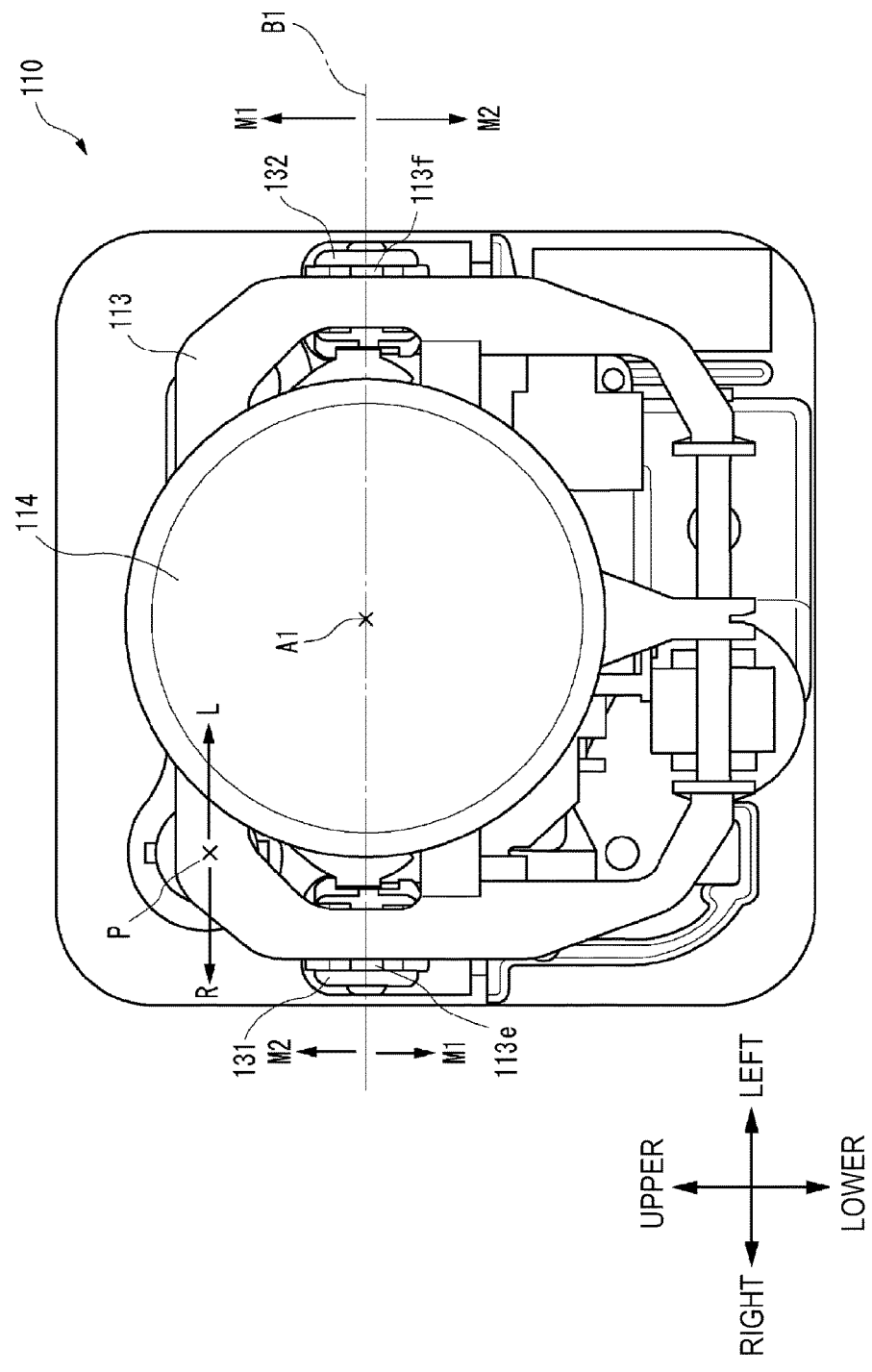
FIG. 15 is a front view showing the lamp unit according to the comparative example

FIGS. 14 and 15 show a lamp unit 110 according to a comparative example. On the rear side of a lens holder 113 corresponding to the lens holder 13, a right shaft portion 113e and a left shaft portion 113f are provided and respectively held by bearings 131, 132. A reference axis B1 connecting the right shaft portion 113e and the left shaft portion 113f corresponds to the reference axis B.

A fitting arm 113g extends rearward at an upper portion of the lens holder 113. The fitting arm 113g is fitted into a fitting groove formed in a link 193 corresponding to the link 93. The rotation of a screw 191 corresponding to the second screw 91 is converted into the front-rear movement of a joint 192 corresponding to the joint 92, so that the link 193 moves the lens holder 13 in the left-right direction. That is, a coupling point of the link 193 and the fitting arm 113g is an acting point P of a transmission mechanism including the screw 191.

Since the acting point P is positioned above the reference axis B1, a moment M1 of moving an optical axis A1 of the projection lens 114 upward is generated when the lens holder 113 is moved to the right by the link 193 (an arrow R). On the contrary, a moment M2 of moving the optical axis A1 of the projection lens 114 downward is generated when the lens holder 113 is moved to the left by the link 193 (an arrow L). The transmission mechanism including the screw 191 serves to translate the optical axis A1 in the left-right direction while maintaining the position in the upper-lower direction of the optical axis A1. However, in reality, the movement in the upper-lower direction of the optical axis A1 occurs due to the movement in the left-right direction of the lens holder 13.

As described above, in the present embodiment, the tip end portion 93c1 of the link 93 is an acting point to which the rotation action of the second screw 91 is applied, and is disposed on the plane which is formed by the optical axis A and the reference axis B. Therefore, a force to move the lens holder 13 in the left-right direction is applied to the same height as the reference axis B, and thus, a moment to move the optical axis A in the upper-lower direction does not occur. In this way, the adjustment accuracy of the optical axis A can be improved while reducing the number of parts and the occupying space of the parts, as described above.

In the present embodiment, a force to move the optical axis A in the left-right direction is applied to the lens holder 13. According to this configuration, since the force to move the optical axis A is directly applied to the lens unit 30, it is possible to obtain desired displacement with a smaller force. In this way, it is possible to reduce the size of the second transmission mechanism. As a result, the occupying space of the lamp unit 10 which includes a mechanism for adjusting the reference position of the optical axis A can be further reduced.

The right shaft portion 13e and the left shaft portion 13f, which form a portion of the reference axis B, are formed as a portion of the lens holder 13. According to this configuration, it is possible to easily form the reference axis B for achieving the displacement of the lens unit 30 as described above by using a process of molding the lens holder 13. Accordingly, it is possible to further easily achieve a configuration capable of reducing the occupying space of the lamp unit 10 which includes the mechanism for adjusting the reference position of the optical axis A. Contrary to this configuration, a member having the axis B on the reflector 23 side may be provided, and a member serving as a bearing may be provided on the lens holder 13 side.

The lamp unit 10 includes the leveling actuator 15 which has the shaft 52 (an example of a driving shaft) for displacing the optical axis A of the projection lens 14 in the upper-lower direction. The first screw 81 and the shaft 52 are arranged to be aligned along the extension direction thereof. According to this configuration, the shaft portion 81b of the first screw 81 and the shaft 52 of the leveling actuator 15 can be as close as possible, and the adjustment for the reference position of the optical axis A of the projection lens 14 and the adjustment for the direction of the optical axis A by the leveling actuator 15 can be made substantially on the same axis. In this way, it is possible to reduce the size of the lamp unit 10 as compared to the configuration where these adjustments are made on the different axis. As a result, it is possible to further reduce the occupying space of the lamp unit 10 including a mechanism for adjusting the reference position of the optical axis A.

The first screw 81 to rotate the right shaft portion 13e and the left shaft portion 13f is intended to adjust the position in the upper-lower direction of the optical axis A, and the second screw 91 to slide the right shaft portion 13e and the left shaft portion 13f is intended to adjust the position in the left-right direction of the optical axis A. Contrary to this configuration, the position in the upper-lower direction of the optical axis A may be adjusted by the sliding of the right shaft portion 13e and the left shaft portion 13f, and the position in the left-right direction of the optical axis A may be adjusted by the rotating of the right shaft portion 13e and the left shaft portion 13f. However, the configuration of the present embodiment is desirable to reduce the dimension in the upper-lower direction, in which restriction on the layout is relatively high when mounted to the headlamp device 1. Accordingly, it is possible to improve the effect of reducing the occupying space of the lamp unit 10 including the mechanism for adjusting the reference position of the optical axis A.

The first screw 81 and the second screw 91 extend through the portion of the heat sink 11, at which the heat dissipation plates 11c are formed. Therefore, it is possible not only to reduce the occupying space of the lamp unit 10 including the mechanism for adjusting the reference position of the optical axis A, but also to improve the mounting workability onto the headlamp device 1. The reason is that the lamp unit 10 is completely assembled to the housing 2 simply by inserting the portion where the heat dissipation plates 11c are formed into the opening 2b formed in the rear wall 2a of the housing 2 from the inside of the lamp chamber 3, as shown in FIG. 1.

Figure 16:
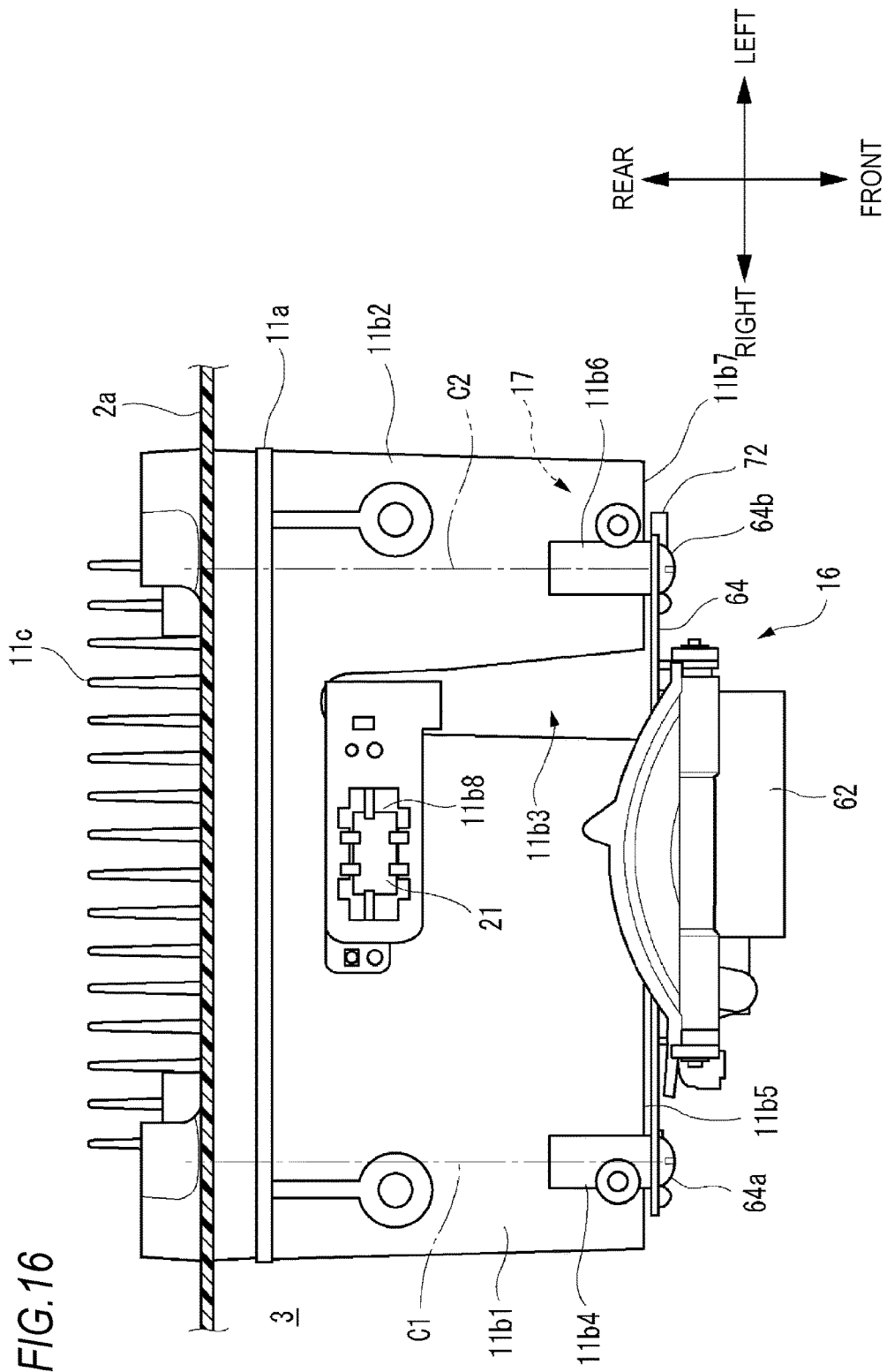
FIG. 16 is a partial cross-sectional plan view showing a portion of the lamp unit.

FIG. 16 shows a positional relationship among the light source 21 supported on the heat sink 11, the light distribution control unit 16 and the operation control unit 17, in the lamp unit 10 assembled to the housing 2.

The rear plate 11a of the heat sink 11 and the portion located on the front side thereof are disposed inside the lamp chamber 3 defined by the housing 2 (an example of a first portion of the heat sink). The portion of the heat sink 11, which is located on the rear side of the rear plate 11a and includes the heat dissipation plates 11c, is exposed to the outside of the housing 2 through the opening 2b formed in the rear wall 2a of the housing 2 (an example of a second portion of the heat sink).

The light source 21 is supported by a light source mounting portion 11b8 (an example of a first region) provided on an upper surface of the right table 11b1 of the heat sink 11. The light distribution control unit 16 is supported by the right support portion 11b4 and the left support portion 11b6 (an example of a second region) in the front end of the support table 11b of the heat sink 11.

A straight line C1 shown in FIG. 16 indicates the shortest path from the right support portion 11b4 to the portion of the heat sink 11 exposed to the outside. A straight line C2 indicates the shortest path from the left support portion 11b6 to the portion of the heat sink 11 exposed to the outside. The light source mounting portion 11b8 is arranged to avoid the paths C1, C2.

The solenoid 62 (an example of an actuator) included in the light distribution control unit 16 can be a heat source during the operation of the headlamp device 1. The heat generated from the solenoid 62 is transferred to the right support portion 11b4 and the left support portion 11b6 via the bracket 64. Therefore, the bracket 64 can be also a heat source. Subsequently, the heat is transferred along the right table 11b1 and the left table 11b2 to reach the heat dissipation plates 11c, and then, is dissipated to the outside of the housing 2. The paths C1, C2 shown above can be said as a path where the heat generated from the solenoid 62 is most quickly transferred.

Here, since the light source mounting portion 11b8 is arranged to avoid the paths C1, C2, it is possible to secure a heat dissipation path where the heat generated from the solenoid 62 does not first reach the light source 21. In this way, the effect of the solenoid 62 as a heat source disposed inside the lamp chamber 3 on the operation state of the light source 21 can be suppressed.

Further, the heat, which is generated from the solenoid 62 and transferred to the bracket 64, is transferred to the support table 11b via the fixing members 64a, 64b which fix the bracket 64 to the right support portion 11b4 and the left support portion 11b6. Since heat transfer occurs when the members are in contact with each other, the "transfer" used herein means that the heat transfer via the fixing members 64a, 64b is dominant. The fixing members 64a, 64b extend in the front-rear direction and respectively enter the inside of the right table 11b1 and the left table 11b2. Therefore, the fixing members 64a, 64b can effectively transfer heat as compared to the portion where the bracket 64 is simply in contact with the support table 11b.

Therefore, it is not necessarily required that the front end edge 11b5 of the right table 11b1 and the front end edge 11b7 of the left table 11b2 are positioned on the rear side of respective front end surfaces of the right support portion 11b4 and the left support portion 11b6 to form a gap between the bracket 64, and the front end edge 11b5 and the front end edge 11b7. However, by adopting a configuration that only the respective front end surfaces of the right support portion 11*b*4 and the left support portion 11*b*6 are in contact with the bracket 64, the heat transfer along the paths C1, C2 can be more dominant.

As is apparent from FIGS. 5 and 6, the operation control unit 17 is supported by the lower support portion 11*e*1 (an example of a second region) of the control unit accommodating portion 11*e* of the heat sink 11. Since the lower support portion 11*e*1 is disposed below the support table 11*b*, it is apparent that the light source mounting portion 11*b*8 is arranged to avoid the shortest path from the lower support portion 11*e*1 to the portion of the heat sink 11 exposed to the outside.

As described above, the first control circuit 71*a*, the second control circuit 72*b* and the third control unit 73*c*, which are included in the operation control unit 17, control the operation of the light source 21, the solenoid 62 (an example of an actuator) and the leveling actuator 15 (an example of an actuator), respectively. These control circuits can be a heat source during the operation of the headlamp device 1. The heat generated from each control circuit is transferred to the lower support portion 11*e*1 via the fixing plate 73. Therefore, the fixing plate 73 can be also a heat source. Subsequently, the heat is transferred along the control unit accommodating portion 11*e* to reach the heat dissipation plates 11*c*, and then, is dissipated to the outside of the housing 2. The shortest path from the lower support portion 11*e*1 to the heat dissipation plates 11*c* can be said as a path where the heat generated from the control circuits is most quickly transferred.

Here, since the light source mounting portion 11*b*8 is arranged to avoid the path, it is possible to secure a heat dissipation path where the heat generated from each control circuit does not first reach the light source 21. In this way, the effect of each control circuit as a heat source disposed inside the lamp chamber 3 on the operation state of the light source 21 can be suppressed.

Further, the heat, which is generated from each control circuit and transferred to the fixing plate 73, is transferred to the control unit accommodating portion 11*e* via the fixing member 64*c* which fixes the fixing plate 73 to the lower support portion 11*e*1. What is meant by the "transfer" is the same as described above. Since the fixing member 64*c* extends in the front-rear direction and enters the inside of the control unit accommodating portion 11*e*, it is possible to effectively transfer heat.

As is apparent from FIGS. 5 and 6, the leveling actuator 15 is supported by the actuator accommodating portion 11*d* (an example of a second region) of the heat sink 11 via the joint 82. Since the actuator accommodating portion 11*d* is disposed below the support table 11*b*, it is apparent that the light source mounting portion 11*b*8 is arranged to avoid the shortest path from the actuator accommodating portion 11*d* to the portion of the heat sink 11 exposed to the outside.

The leveling actuator 15 can be a heat source during the operation of the headlamp device 1. The heat generated from the leveling actuator 15 is transferred along the actuator accommodating portion 11*d* to reach the heat dissipation plates 11*c*, and then, is dissipated to the outside of the housing 2. The shortest path from the actuator accommodating portion 11*d* to the heat dissipation plates 11*c* can be said as a path where the heat generated from the leveling actuator 15 is most quickly transferred.

Here, since the light source mounting portion 11*b*8 is arranged to avoid the path, it is possible to secure a heat dissipation path where the heat generated from the leveling actuator 15 does not first reach the light source 21. In this way, the effect of the leveling actuator 15 as a heat source disposed inside the lamp chamber 3 on the operation state of the light source 21 can be suppressed.

Further, since a portion of the heat sink 11 is disposed inside the lamp chamber 3, the occupying space of the heat sink 11 in the outside of the housing 2 is minimized. Accordingly, it is possible to provide the size-reduced headlamp device 1. It is possible to effectively dissipate the heat generated from each heat source disposed inside the lamp chamber 3 while adopting this configuration. Therefore, the effect of the heat source on the operation state of the light source 21 can be suppressed.

As shown in FIG. 16, the heat sink 11 (as an example of the first heat sink) includes the right table 11*b*1 (as an example of the first portion of the first heat sink) and the left table 11*b*2 (as an example of the second portion of the first heat sink), which are partitioned by the cut-out 11*b*3 (an example of the gap). The light source 21 is supported on the right table 11*b*1. As is apparent from FIG. 6, the operation control unit 17 (an example of the control part) is supported by the control unit accommodating portion 11*e*. The control unit accommodating portion 11*e* is molded integrally with the left table 11*b*2 and can be regarded as a portion of the left table 11*b*2.

As described above, the operation control unit 17 includes the first control circuit 71*a* for controlling at least an on/off operation of the light source 21. The first control circuit 71*a* can be a heat source during the operation of the lamp unit 10. The heat generated from the first control circuit 71*a* is transferred to the left table 11*b*2 via the control unit accommodating portion 11*e*.

However, since the right table 11*b*1 and the left table 11*b*2 are isolated by the cut-out 11*b*3, the heat generated from the first control circuit 71*a* is less likely to reach the light source 21. That is, it is possible to suppress the effect of the heat source on the operation state of the light source 21 even while employing the operation control unit 17 as a heat source in the lamp unit 10.

The operation control unit 17 includes the board 71 and the fixing plate 73. The first control circuit 71*a* is provided on the board 71. The fixing plate 73 is fixed to the control unit accommodating portion 11*e* while supporting the board 71.

Since the fixing plate 73 is made of high-thermal conductive material such as aluminum, the fixing plate itself serves as a heat dissipation plate (an example of the second heat sink). Therefore, it is possible to more effectively dissipate the heat generated from the first control circuit 71*a*.

The operation control unit 17 further includes the heat transfer sheet 74 disposed between the board 71 and the fixing plate 73.

In this case, the heat generated from the first control circuit 71*a* provided on the board 71 can be more effectively transferred to the fixing plate 73, and hence, can be subjected to dissipation.

The surface of the board 71 formed of conductive material such as aluminum may be subjected to oxidation treatment or an insulating material layer may be formed on the surface. At least a portion of the first control circuit 71*a*, the second control circuit 71*b* and the third control circuit 71*c* may be provided on the insulating material layer.

According to this configuration, the board 71 itself can exhibit heat-dissipation function. In this case, the fixing plate 73 and the heat transfer sheet 74 are not necessary, and thus, it is possible to reduce the number of parts of the operation control unit 17. Meanwhile, it is required to provide the board 71 with a structure corresponding to the fixing piece 73*a*.

The right table 11b1 and the left table 11b2 respectively have a portion extending in the front-rear direction (an example of the first direction of the first heat sink). A main surface of the board 71 extends in the upper-lower direction (an example of the second direction of the first heat sink) intersecting with the front-rear direction.

According to this configuration, it is easy to secure a space for disposing the leveling actuator 15, in the side of the operation control unit 17. Therefore, it is possible to provide the lamp unit 10 having high space utilization efficiency. Alternatively, it is possible to effectively utilize a space occurring in the side of the lamp unit 10 equipped with the leveling actuator 15.

As described above, the right table 11b1 and the left table 11b2 have a portion extending in the front-rear direction, respectively. Here, the light source 21 is disposed on the upper side (an example of the first side) of the portion extending in the front-rear direction, and the operation control unit 17 is disposed on the lower side (the side opposite to the side where the light source 21 is disposed; an example of the second side) of the portion extending in the front-rear direction.

According to this configuration, the heat generated from the operation control unit 17 is less likely to reach the light source 21. Accordingly, it is possible to suppress the effect of the heat source on the operation state of the light source 21 even while employing the operation control unit 17 as a heat source in the lamp unit 10.

Further, it is easy to secure a space for disposing the leveling actuator 15 in the side of the operation control unit 17. Therefore, it is possible to provide the lamp unit 10 having high space utilization efficiency. In other words, it is possible to effectively utilize a space occurring in the side of the lamp unit 10 equipped with the leveling actuator 15.

Figure 17:
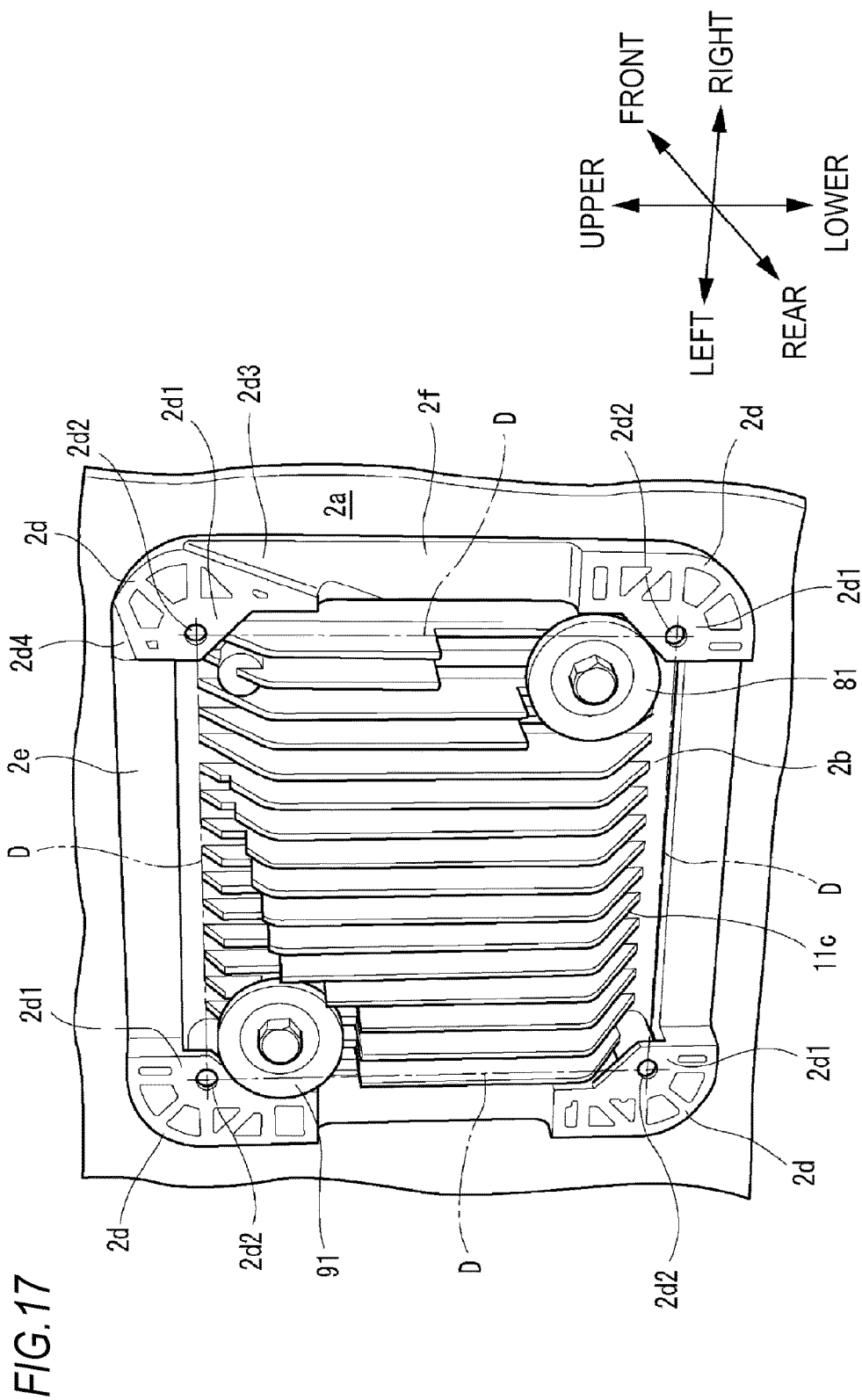
FIG. 17 is a perspective view showing a portion of the rear surface of the lighting device.

As shown in FIG. 17, a plurality of heat dissipation plates 11c extending in the upper-lower direction are formed on the rear surface of the rear plate 11a of the heat sink 11. A total of four posts are provided between the region (an example of the first portion of the heat sink) where the gasket 11f is mounted and the region (an example of the second portion of the heat sink) where the heat dissipation plates 11c are formed. Each post extends rearward from the rear surface of the rear plate 11a. Each post is formed with a hole extending in the front-rear direction.

As shown in FIG. 17, the opening 2b of the housing 2 has a substantially square shape. A total of four reinforcing blocks 2d are formed at portions corresponding to four corners of the opening 2b. Each reinforcing block 2d is formed by making the thickness of the rear wall 2a of the housing 2 to be thicker than other portions.

A portion of each reinforcing block 2b forms a fixing portion 2d1 which extends to overhang the opening 2b. In other words, each fixing portion 2d1 is disposed at a position facing the opening 2b on the outside of the rear wall 2a. Each fixing portion 2d1 is formed with a through-hole 2d2.

As the lamp unit 10 is assembled from the inside of the housing 2, each of four posts formed on the rear surface of the rear plate 11a of the heat sink 11 is arranged to face the corresponding one of four fixing portions 2d1. The hole formed in each post is arranged to face the corresponding through-hole 2d2. As shown in FIG. 4, a fixing member such as a screw is fitted into the hole formed in each post through each through-hole 2d2, and hence, the heat sink 11 is fixed to the housing 2.

In FIG. 17, a straight line connecting the fixing portions 2d1 (precisely, the centers of the through-holes 2d2) to each other is indicated by a reference numeral D. The first screw 81 and the second screw 91 are arranged inside a region defined by the straight lines D. Effects obtained by the above configuration will be described with reference to a comparative example.

Figure 18:
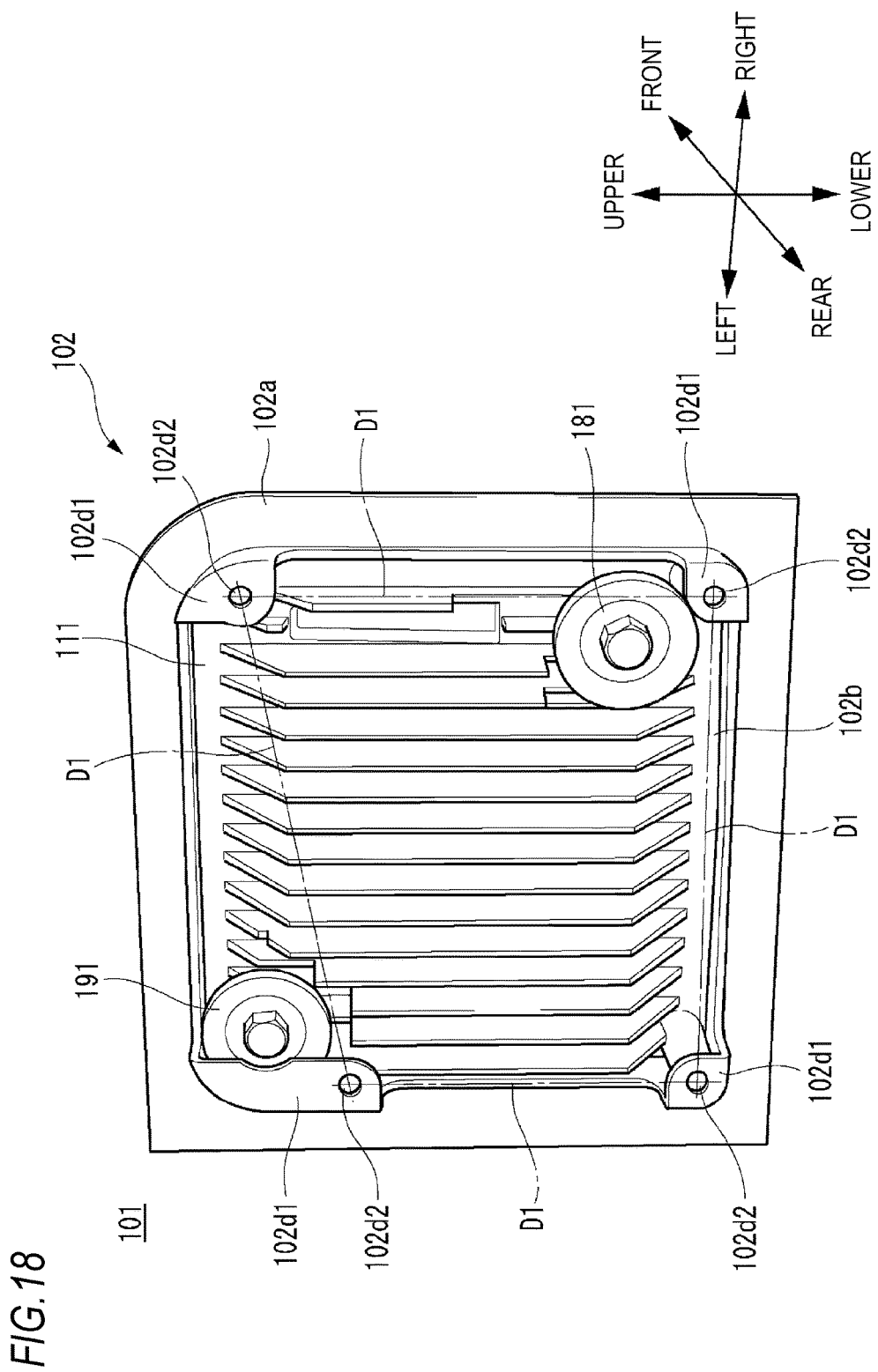
FIG. 18 is a perspective view showing a portion of the rear surface of the lighting device according to the comparative example.

FIG. 18 is a perspective view of a headlamp device 101 according to a comparative example as seen from the rear surface side. A portion of a heat sink 111 is exposed to the outside of a housing 102 through an opening 102b formed in a rear wall 102a of the housing 102. At a portion of a peripheral edge of the opening 102b, a total of four fixing portions 102d1 which extend to overhang the opening 102b are formed by a rolling process. Each fixing portion 102d1 is formed with a through-hole 102d2 through which a fixing member such as a screw is inserted.

In FIG. 18, a straight line connecting the fixing portions 102d1 (precisely, the centers of the through-holes 102d2) to each other is indicated by a reference numeral D1. A first screw 181 corresponding to the first screw 81 of the above embodiment is arranged inside a region defined by the straight lines D1. On the other hand, a second screw 191 corresponding to the second screw 91 of the above embodiment is arranged outside the region defined by the straight lines D1.

The region defined by the straight lines D1 corresponds to a region where a fastening force by four fixing members is strongly applied in a planar fashion. Since the second screw 191 is arranged outside the region defined by the straight lines D1, a fastening force by the fixing members, which is applied to the position of the second screw, is relatively small. On the other hand, in order to adjust the reference position of the optical axis of the projection lens, the second screw 191 is subjected to a rotation operation by a tool. When stress by the rotation operation is applied to the place which the fastening force by the fixing members is less likely to reach, a gap tends to occur between the housing 102 and the heat sink 111, and thus, there is a possibility that the water and dust resistance is degraded.

On the other hand, in the present embodiment, both the first screw 81 and the second screw 91 are disposed inside the region defined by the straight lines D which connects the fixing portions 2d1 to each other. In other words, both the first screw 81 and the second screw 91 are disposed inside the region where the fastening force by the fixing members mounted to the fixing portions 2d1 is strongly applied in a planar fashion. Accordingly, even when at least one of the first screw 81 and the second screw 91 is subjected to the rotation operation by a tool in order to adjust the reference position of the optical axis A of the projection lens 14 (an example of the optical system), the effect of the stress occurring by the operation on the water and dust resistance between the housing 2 and the heat sink 11 can be suppressed.

Further, each fixing portion 2d1 is disposed at a position facing the opening 2b on the outside of the rear wall 2a, and the first screw 81 and the second screw 91 extend through the portion of the heat sink 11, at which the heat dissipation plates 11c are formed. Therefore, it is possible not only to further reduce the occupying space of the lamp unit 10, but also to improve the mounting workability onto the headlamp device 1. The reason is that the lamp unit 10 is completely assembled to the housing 2 simply by inserting the portion where the heat dissipation plates 11c are formed into the opening 2b from the inside of the housing 2, as shown in FIG. 1.

That is, it is possible to secure a high water and dust resistance while employing the configuration that the first screw 81 and the second screw 91 for adjusting the reference position of the optical axis A of the projection lens 14 are provided, and meeting the demands of size-reduction.

Further, as described with reference to FIG. 8, the gasket 11*f* (as an example of the water-resistant member) mounted to the back surface of the rear plate 11*a* of the heat sink 11 is accommodated in the frame wall 2*c* (see FIG. 1) which forms a portion of an inner surface of the rear wall 2*a* of the housing 2. With this configuration, moisture or dust is further reliably prevented from entering the lamp chamber 2 through the opening 2*b*.

The reinforcing blocks 2*d* (the first thickness portion) with a thick thickness (as an example of the first thickness) are formed on an outer surface of the housing 2. The expression, "thick thickness," is used in the meaning to distinguish from the structure whose dimension in the front-rear direction is locally increased by a rolling process, as in the fixing portions 102*d*1 according to the comparative example shown in FIG. 18. That is, although a portions of the fixing portion 102*d*1 according to the comparative example extends rearward from the peripheral edge of the opening 102*b*, the plate pressure is equal to or less than the sites of the rear wall 102*a* other than the portion. The reinforcing block 2*d* in the present embodiment has a shape whose thickness dimension is substantially greater than a plate thickness (as an example of the second thickness) of the sites (as an example of the second thickness portion) of the rear wall 2*a* other than the portion.

According to this configuration, the stress caused by the rotation operation of the first screw 81 or the second screw 91 is reliably received by the reinforcing blocks 2*d*, and hence, the effect of the stress on the water and dust resistance between the housing 2 and the heat sink 11 can be further suppressed.

As shown in FIG. 17, the reinforcing block 2*d* is not provided on extension lines of the grooves formed by the heat dissipation plates 11*c*. In other words, a region 2*e* of the rear wall 2*a* located on the extension lines of the grooves is formed by a portion thicker than the reinforcing blocks 2*d*.

The heat dissipated through the heat sink 11 moves along the grooves. Since the thick reinforcing block 2*d* is not provided at the movement destination, the dissipation of heat can be smoothly performed without being hindered.

In the present embodiment, the extension direction of the grooves formed by the heat dissipation plates 11*c* is the upper-lower direction (as an example of the first direction).

Since the heat generated escapes upward, the heat dissipated through the heat sink 11 is effectively directed upward along the inside of the grooves. Therefore, it is possible to further improve the heat dissipation efficiency.

The reinforcing block 2*d* provided at the upper right corner of the opening 2*b* has inclined surfaces 2*d*3, 2*d*4 (as an example of the inclined surface) extending in a direction inclined with respect to the upper-lower direction and the left-right direction. The inclined surface 2*d*3 forms a boundary with a region 2*f* thinner than the reinforcing block 2*d*, and defines an insertion path of a tool for operating the first screw 81. The tool is movable in the range of the region 2*f*. The inclined surface 2*d*4 forms a boundary with the region 2*e*, and defines an insertion path of a tool for operating the first screw 91. The tool is movable in the range of the region 2*e*.

According to this configuration, the countermeasure for stress caused by the operation of the first screw 81 and the second screw 82 and the improvement in the workability can be both achieved.

In the above embodiment, a total of four fixing portions 2*d*1 are provided so as to fix the heat sink 11 to the housing 2. However, the number of the fixing portions is not limited to four. The number and arrangement of the fixing portions can be properly determined according to the specification of the opening 2*b* and the heat sink 11, so long as at least three fixing portions capable of defining a region formed by straight lines connecting the fixing portions to each other are provided.

Figure 19A:
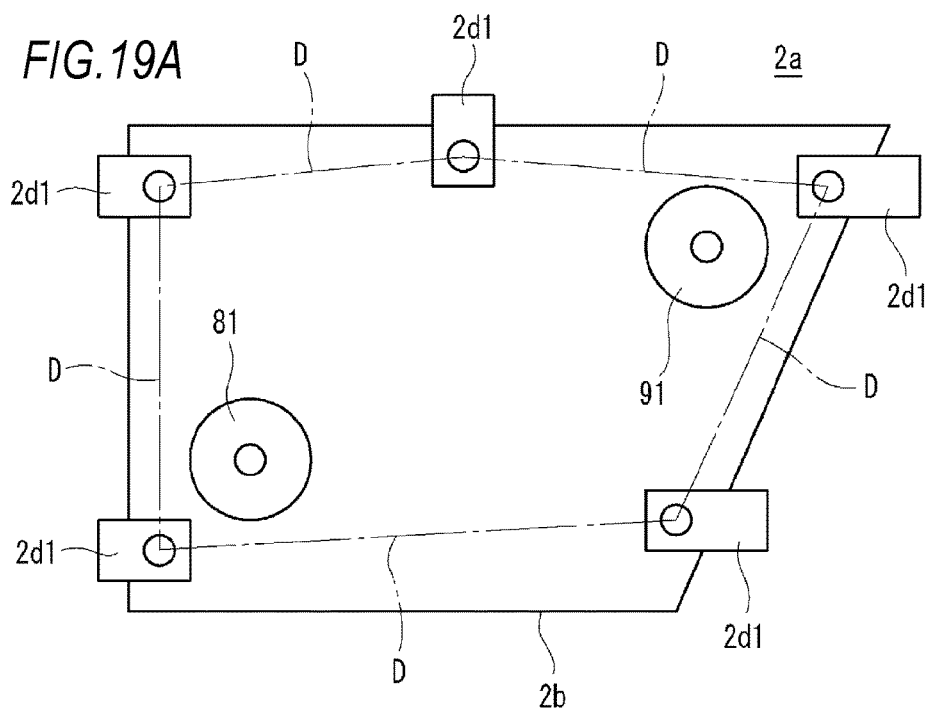
FIGS. 19A and 19B are schematic views showing a portion of the rear surface of a lighting device according to a modified example.
Figure 19B:
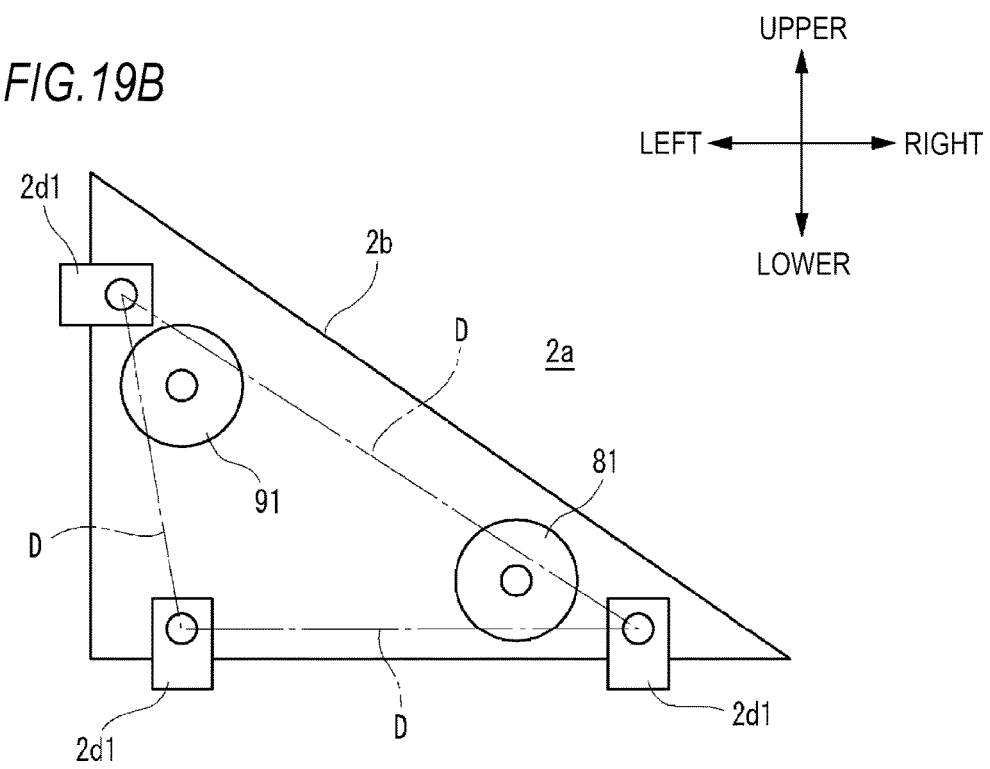

For example, as shown in FIG. 19A, a total of five fixing portions 2*d*1 may be provided in the trapezoidal opening 2*b*. The positions of the first screw 81 and the second screw 91 can be also properly determined according to the specification of the lamp unit 10, so long as the first screw 81 and the second screw 91 are disposed within a range defined by the straight lines D connecting the fixing portions 2*d*1 to each other. FIG. 19B shows an example where a total of three fixing portions 2*d*1 are provided in the triangular opening 2*b*. The first screw 81 and the second screw 91 may be partially located outside the region when the rotation axes of the first screw 81 and the second screw 91 are arranged within the range defined by the straight lines D connecting the fixing portions 2*d*1 to each other.

Figure 20:
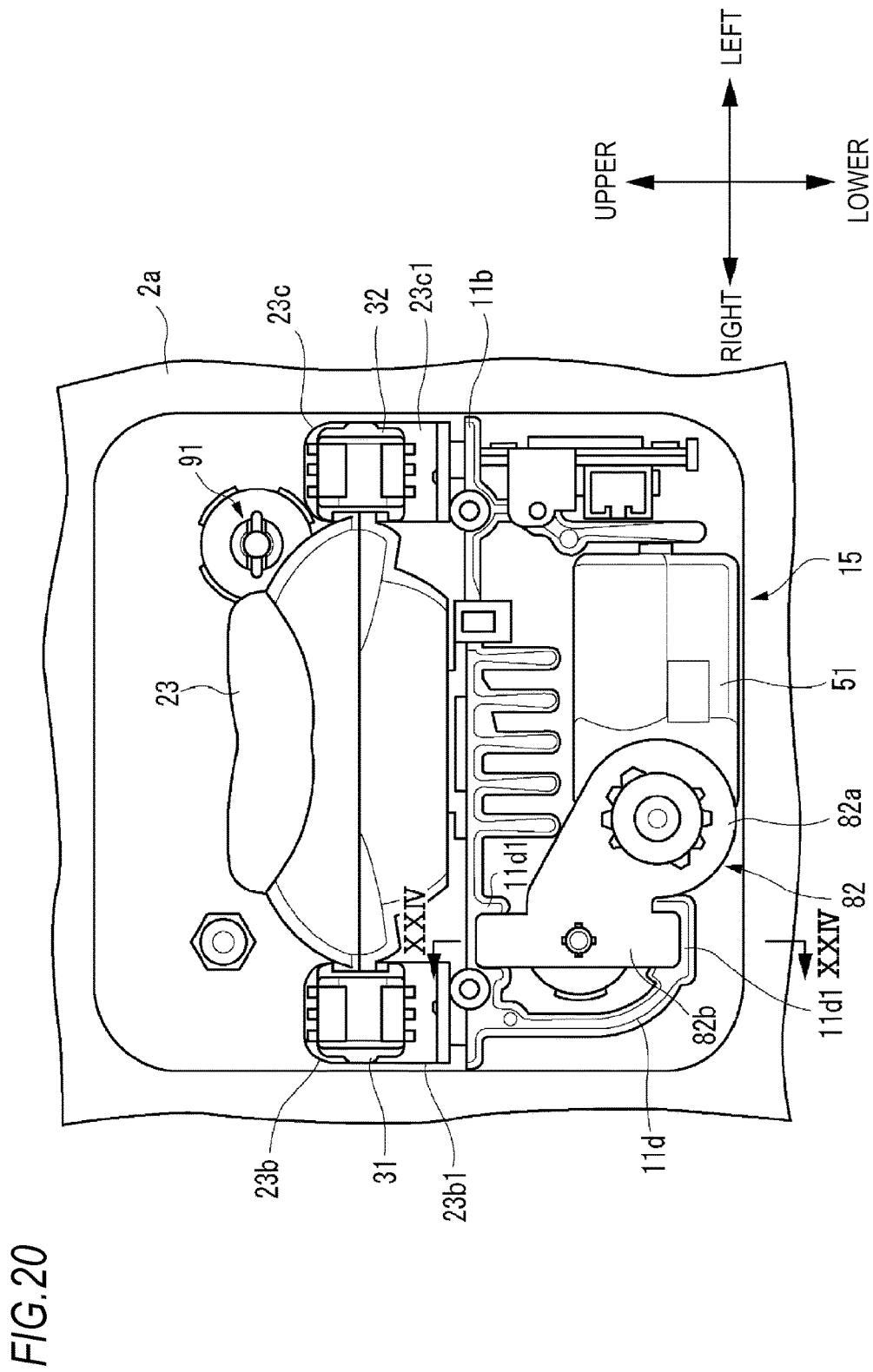
FIG. 20 is a front view showing a portion of the lighting device.

FIG. 20 is a front view showing a portion (in the state where the lens holder 13, the projection lens 14, the light distribution control unit 16 and the link 93 are removed) of the lamp unit 10 mounted to the housing 2. In the present embodiment, the second screw 91 is disposed within the range defined by the straight lines D connecting the fixing portions 2*d*1 of the housing 2 to each other. As a result, the second screw 91 and the reflector 23 are in close proximity within the lamp chamber 3.

Figure 21A:
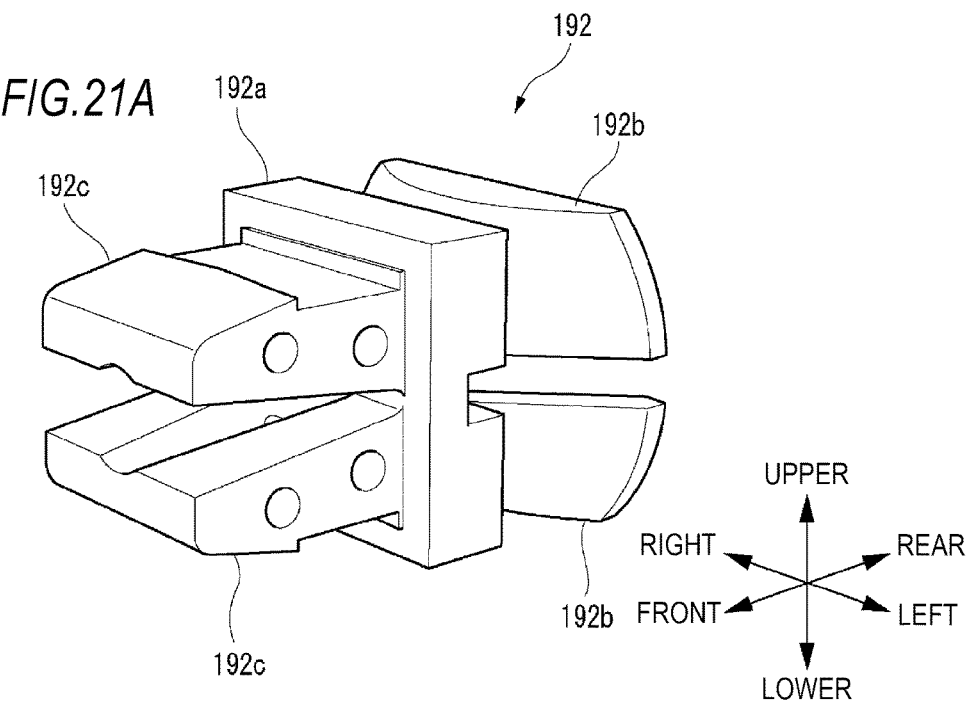
FIGS. 21A and 21B are views showing a portion of a second aiming mechanism according to the comparative example.
Figure 21B:
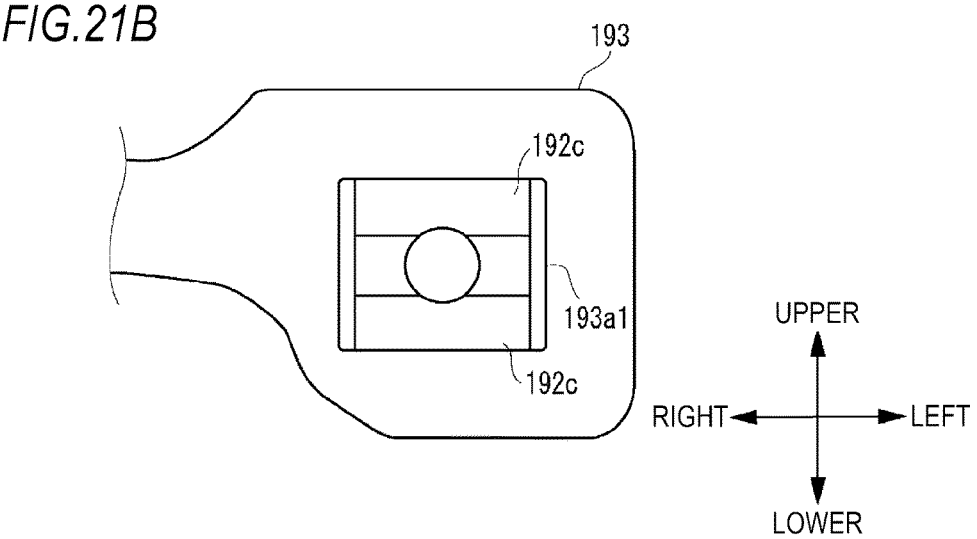

FIG. 21A is a perspective view showing the joint 192 according to the comparative example. The joint 192 has a main body 192*a*, clamping pieces 192*b*, and locking pieces 192*c*. The main body 192*a* has a rectangular cross-section, as seen in a front view. The clamping pieces 192*b* are disposed at the rear of the main body 192*a* and clamp the shaft portion of the second screw from the upper-lower direction. The locking pieces 192*c* are disposed in front of the main body 192*a* and are fitted and locked to a fitting hole 193*a*1 formed at a left end portion of the link 193 according to the comparative example shown in FIG. 21B. As shown in FIG. 21B, the fitting hole 193*a*1 has a rectangular cross-section, as seen in a front view, and the locking pieces 192 have a rectangle-based shape, as seen in a front view. As the locking pieces 192*c* having such a shape are fitted into the fitting hole 193*a*1 having the rectangular cross-section, the rotation of the joint 192 due to the rotation of the second screw is prevented.

However, the rectangle-based shape of the joint 192 cannot avoid the increase of the cross-sectional area in the upper-lower and left-right directions, and hence, the link 193 for accommodating a portion of the joint 192 cannot also avoid the increase of the dimension in the upper-lower and left-right directions. Therefore, when the second screw 91 is arranged in close proximity with the reflector 23 as described above, there is a possibility that the joint 192 or the link 193 interferes with the reflector 23. Alternatively, there is a possibility that the position or shape of the reflector 23 is limited in order to avoid such interference.

Figure 22A:
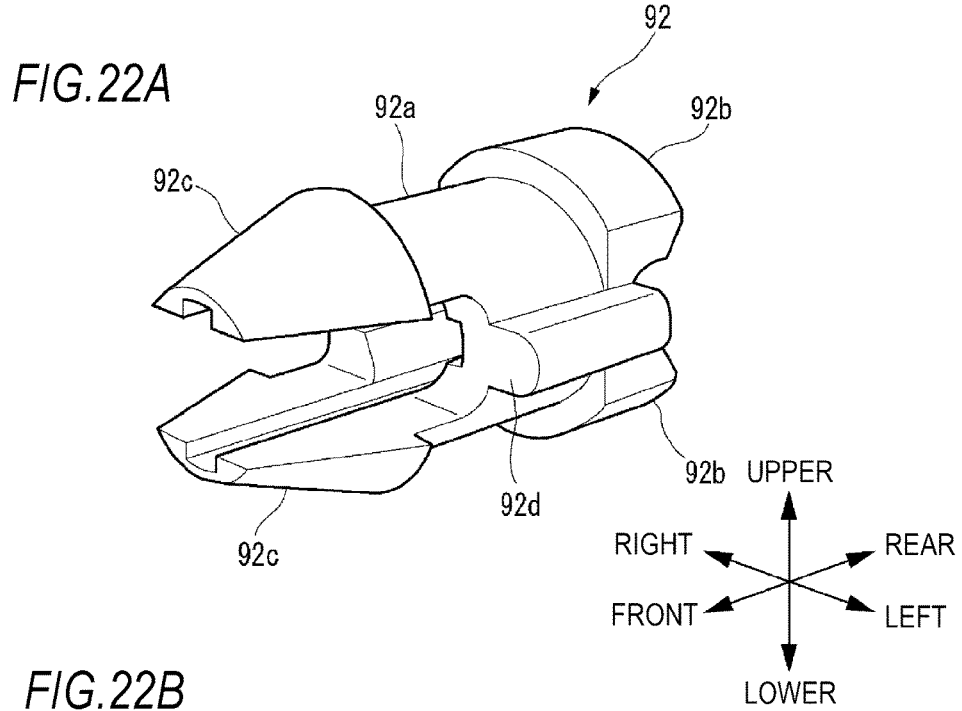
FIGS. 22A and 22B are views showing a portion of the second aiming mechanism.
Figure 22B:
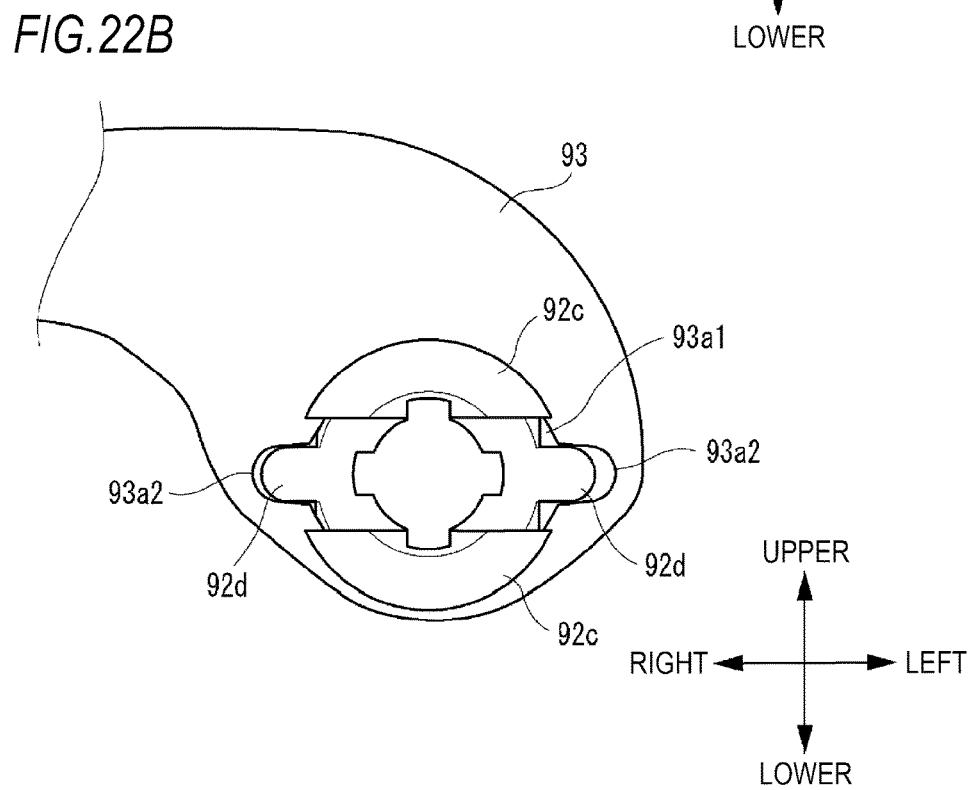

Therefore, the joint 92 according to the present embodiment is configured to form a cylinder-based shape, as shown in FIG. 22A. The joint 92 has a main body 92*a*, clamping pieces 92*b*, locking pieces 92*c*, and protrusions 92*d*. The main body 92*a* has a circular cross-section, as seen in a front view. The clamping pieces 92*b* are disposed at the rear of the main body 92*a* and clamp the shaft portion 91*b* of the second screw 91 from the upper-lower direction. The locking pieces 92c are disposed in front of the main body 92a, and are fitted and locked to a fitting hole 93a1 formed at a left end portion of the link 93 shown in FIG. 22B. The protrusions 92d protrude in the left-right direction from the left and right sides of the main body 92a.

The fitting hole 93a1 has a circular cross-section, as seen in a front view, and grooves 93a2 are formed at an inner wall of the left and right sides of the fitting hole 93a1. When the locking pieces 92c are fitted into the fitting hole 93a1, the protrusions 92d are fitted to the grooves 93a2. The rotation of the joint 92 due to the rotation of the second screw 91 is prevented by the engagement between the protrusions 92d and the grooves 93a2.

According to this configuration, the cross-section area in the upper-lower and left-right directions of the joint 92 can be minimized. Further, the dimension in the upper-lower and left-right directions of the link 93 for accommodating a portion of the joint 92 can be also minimized Therefore, when the second screw 91 is arranged in close proximity with the reflector 23 as described above, the interference of the joint 92 or the link 93 to the reflector 23 can be easily avoided. In other words, the degree of freedom in designing the position and shape of the reflector 23 is improved.

As shown in FIG. 20, the right arm portion 23b and the left arm portion 23c are formed integrally to the left and right portions of the reflector 23, respectively. The right arm portion 23b has a first portion 23b1 extending in the upper-lower direction. The right bearing 31 for holding the right shaft portion 13e of the lens holder 13 is mounted to the first portion 23b1. Further, the left arm portion 23c has a first portion 23c1 extending in the upper-lower direction. The left bearing 32 for holding the left shaft portion 13f of the lens holder 13 is mounted to the first portion 23c1.

FIG. 23 is a plan view of a portion of the lamp unit 10 in the state shown in FIG. 20, as seen from above. The right arm portion 23b has a second portion 23b2 extending rearward from the first portion 23b1. A rear end of the second portion 23b2 is fixed to the support table 11b of the heat sink 11 by a fixing member 23b3 such as a screw. The fixed position by the fixing member 23b3 is located immediately behind the right bearing 31. Further, the left arm portion 23c has a second portion 23c2 extending rearward from the first portion 23c1. A rear end of the second portion 23c2 is fixed to the support table 11b of the heat sink 11 by a fixing member 23c3 such as a screw. The fixed position by the fixing member 23c3 is located immediately behind the left bearing 32.

The right shaft portion 13e and the left shaft portion 13f of the lens holder 13 are fitted to the fitting groove 31b of the right bearing 31 and the fitting groove 32b of the left bearing 32 from the front, respectively. According to the configuration described above, a pressing force rearwardly acting on the reflector 23 during the fitting operation is reliably received at the fixed position by the fixing members 23b3, 23c3. Therefore, the occurrence of the backlash and positional deviation of the reflector 23 due to the mounting operation of the lens holder 13 is prevented, so that the accuracy and stability of the optical system can be secured. That is, the light emitted from the light source 21 can be accurately directed to the projection lens 14 by the reflector 23.

As shown in FIG. 23, a connection portion 23b4 between the right arm portion 23b and the reflector 23 is disposed in front of both a rear end of the second portion 23b2 and a rear end portion 23d of the reflector 23, so that a concave portion 23b5 is defined between the second portion 23b2 and the reflector 23. Further, a connection portion 23c4 between the left arm portion 23c and the reflector 23 is disposed in front of both a rear end of the second portion 23c2 and the rear end portion 23d of the reflector 23, so that a concave portion 23c5 is defined between the second portion 23c2 and the reflector 23.

According to this configuration, the reflector 23 can be mounted to the support table 11b from above in the state where the second screw 91 and the fulcrum member 94 are first mounted to the rear plate 11a of the heat sink 11. Therefore, the assembling workability is greatly improved.

In other words, the positions of the connection portions 23b4, 23c4 are determined such that the concave portions 23b5, 23c5 of dimensions in which the reflector 23 mounted to the heat sink 11 from above is prevented from interfering with the second screw 91 and the fulcrum member 94 can be defined. Since the interference of the reflector 23 with the second screw 91 and the fulcrum member 94 during the assembling of the reflector 23 can be avoided, the occurrence of the backlash and positional deviation of the reflector 23 is prevented, and thus, the accuracy and stability of the optical system can be secured. That is, the light emitted from the light source 21 can be accurately directed to the projection lens 14 by the reflector 23.

As shown in FIG. 20, the actuator accommodating portion 11d of the heat sink 11 is formed with a guide rail 11d1. As described above, the joint 82 of the first aiming mechanism 18 has the coupling portion 82a and the slider portion 82b. The coupling portion 82a extends in the left-right direction and is coupled to the case 51 of the leveling actuator 15. The slider portion 82b is fitted into the guide rail 11d1.

Figure 24:
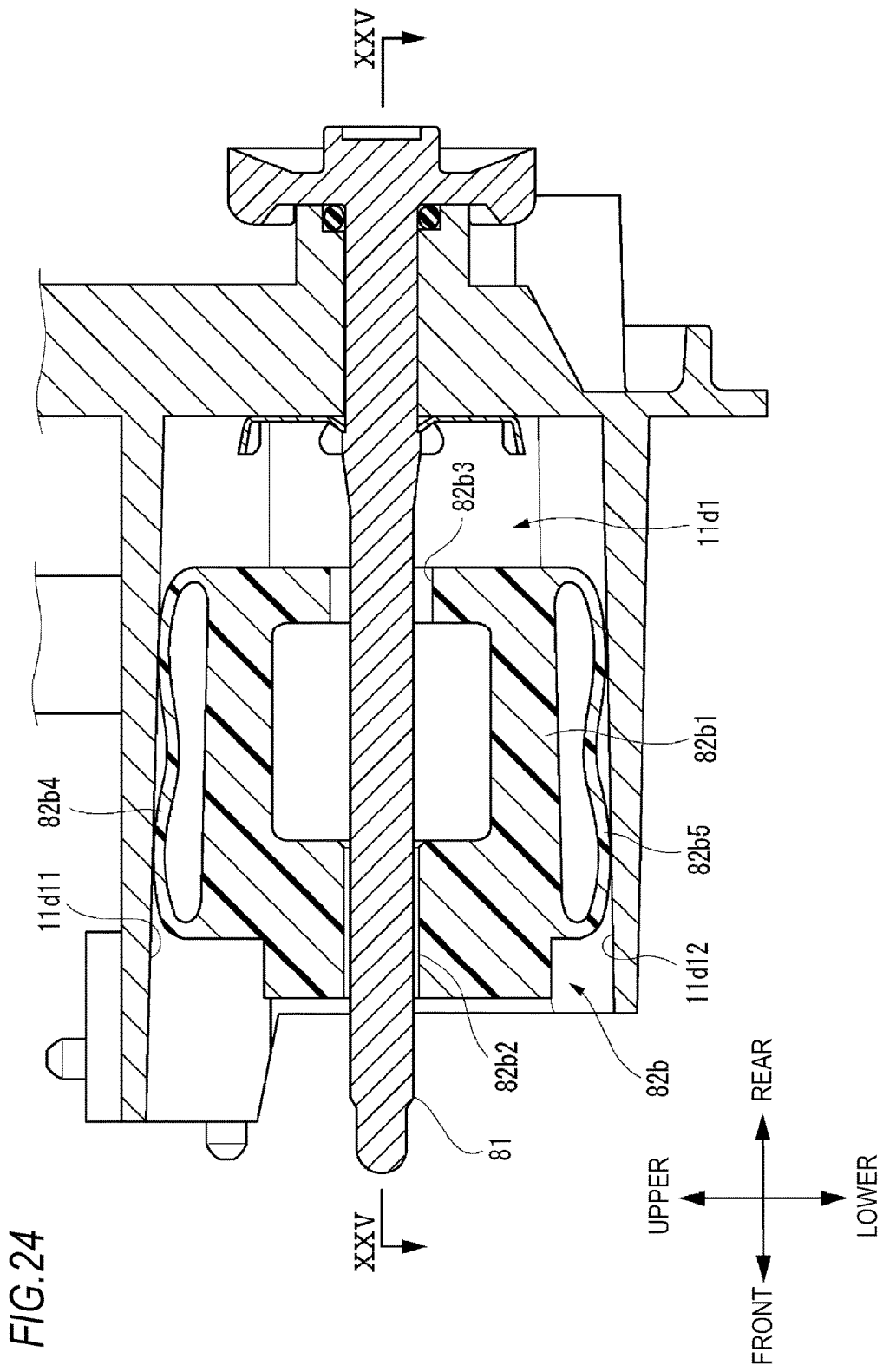
FIG. 24 is a cross-sectional view taken along a line XXIV-XXIV shown in FIG. 20.

FIG. 24 is a cross-sectional view taken along a line XXIV-XXIV shown in FIG. 20. The guide rail 11d1 extends in the front-rear direction and the slider portion 82b can be slid in the front-rear direction inside the guide rail 11d1. The slide portion 82b has a main body 82b1, a front through-hole 82b2, a rear through-hole 82b3, an upper holding piece 82b4, and a lower holding piece 82b5.

The front through-hole 82b2 extends rearward from a front end surface of the main body 82b1 and is formed at its inner peripheral surface with a threaded groove. An inner diameter of the front through-hole 82b2 is substantially the same as an outer diameter of the shaft portion 81b of the first screw 81, and the front through-hole 82b2 is screwed to the threaded groove formed at an outer periphery of the shaft portion 81b. The rear through-hole 82b3 extends forward from a rear end surface of the main body 82b1. An inner diameter of the rear through-hole 82b3 is greater than an outer diameter of the shaft portion 81b of the first screw 81.

The upper holding piece 82b4 is formed integrally with an upper surface of the main body 82b1 and has elasticity. The upper holding piece 82b4 is in contact with an upper wall 11d11 of the guide rail 11d1. The lower holding piece 82b5 is formed integrally with a lower surface of the main body 82b1 and has elasticity. The lower holding piece 82b5 is in contact with a lower wall 11d12 of the guide rail 11d1.

Figure 25:
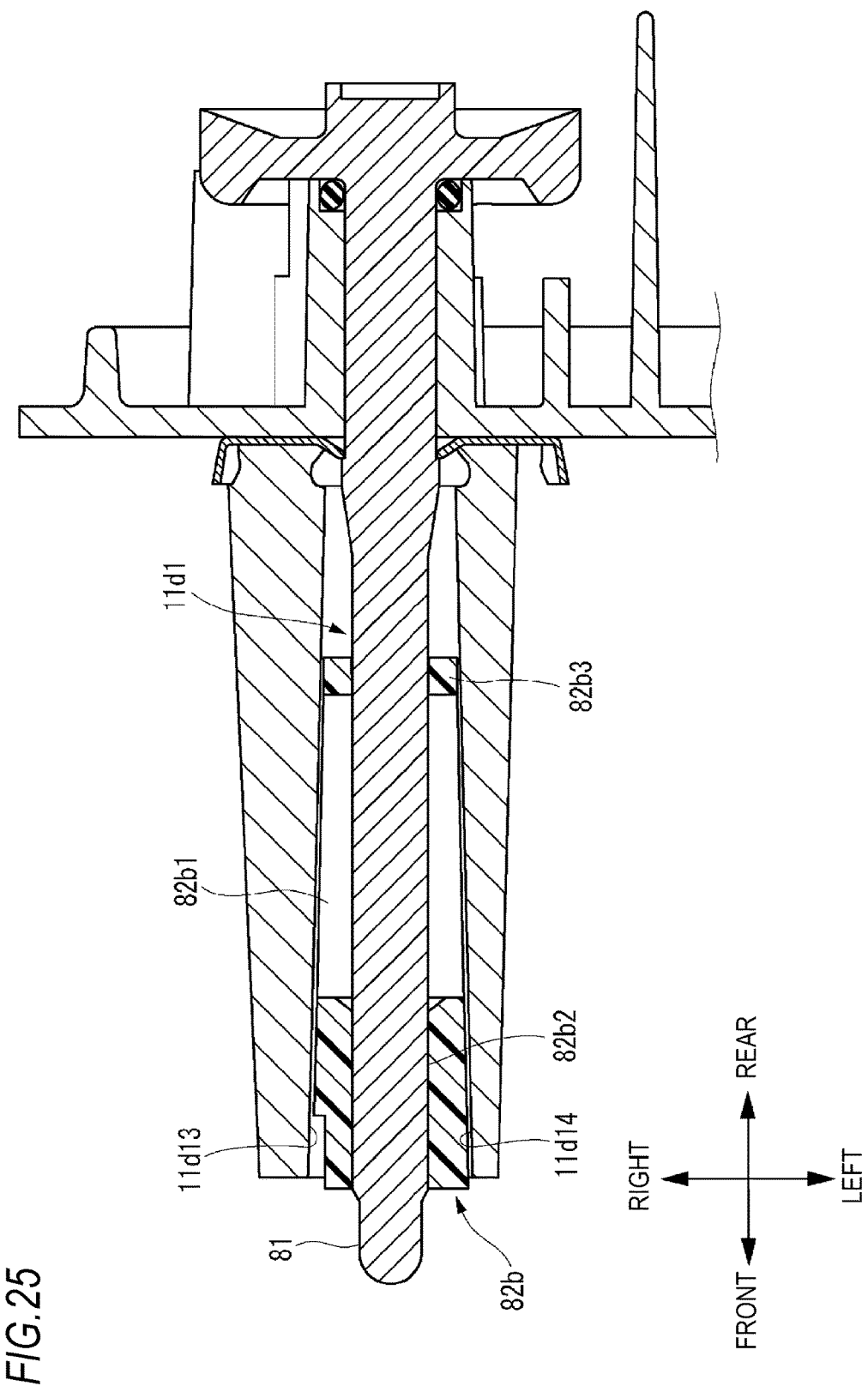
FIG. 25 is a cross-sectional view taken along a line XXV-XXV shown in FIG. 24.

FIG. 25 is a cross-sectional view taken along a line XXV-XXV shown in FIG. 24. An interval between a right wall 11d13 and a left wall 11d14 of the guide rail 11d1 expands toward the front. In other words, the right wall 11d13 and the left wall 11d14 are inclined in the left-right direction. These walls are inclined surfaces which are naturally formed by the draft of a mold used for molding the heat sink 11.

A width in the left-right direction of the main body 82b1 of the slider portion 82b expands toward the front. More specifically, a right surface and a left surface of the main body 82b1 are inclined at an angle corresponding to the draft. In this way, the left and right surfaces of the slider portion 82*b* is substantially in contact with the right wall 11*d*13 and the left wall 11*d*14 of the guide rail 11*d*1 without any gap.

Figure 26:
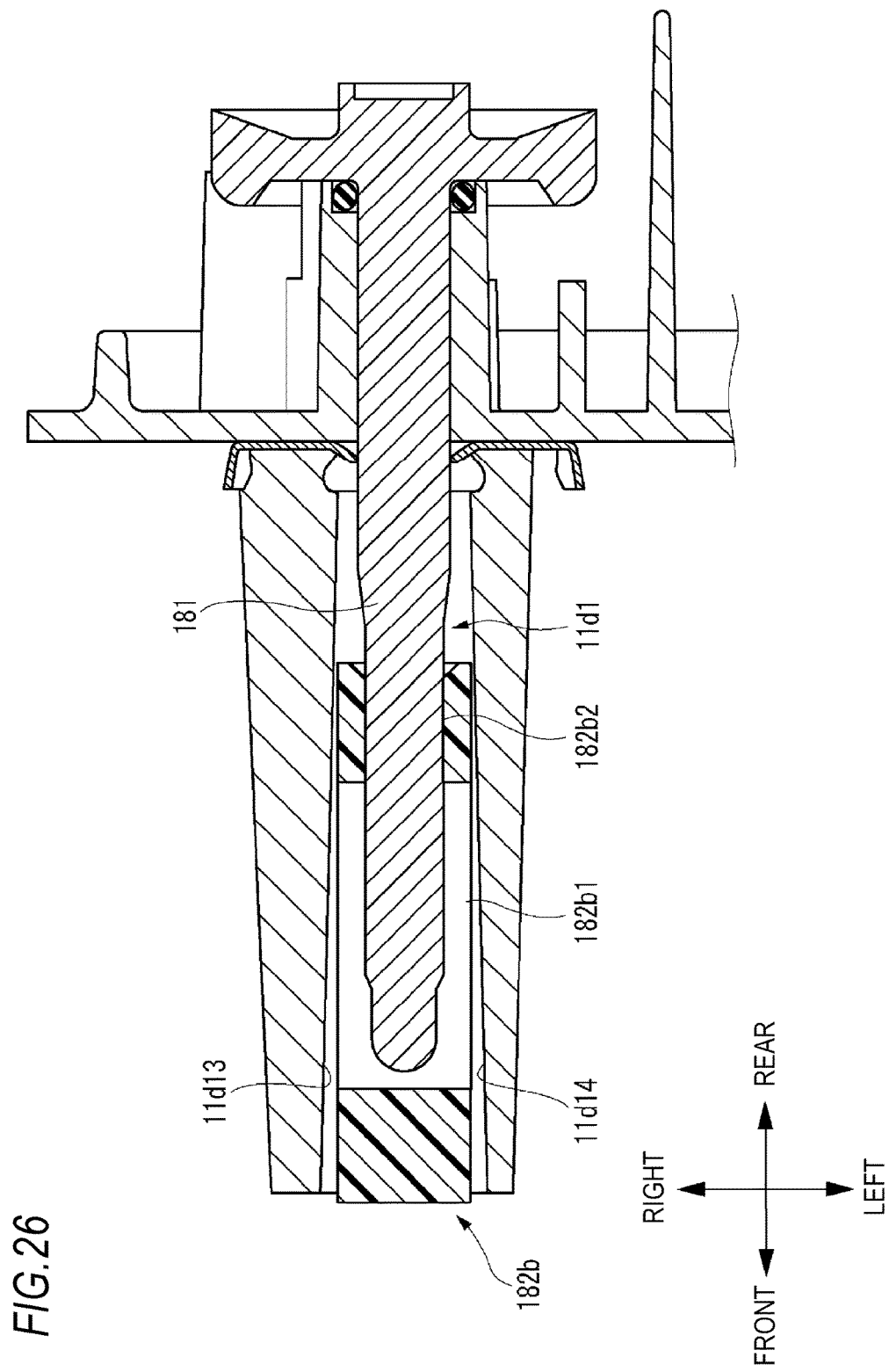
FIG. 26 is a cross-sectional view showing a portion of a first aiming mechanism according to the comparative example.

Effects obtained by the above configuration will be described with reference to a comparative example. FIG. 26 is a sectional view corresponding to FIG. 25, showing a slider portion 182*b* of a joint according to a comparative example A width in the left-right direction of a main body 182*b*1 included in the slider portion 182*b* is substantially the same as an interval between the right wall 11*d*13 and the left wall 11*d*14 in the vicinity of the rear end portion of the guide rail 11*d*1. Further, a through-hole 182*b*2 formed with a threaded groove extends forward from the rear end surface of the main body 182*b*1.

In the case of such configuration, the main body 182*b*1 is screwed with the first screw 181 at the rear portion thereof. A moment occurring due to the rotation operation of the first screw 181 acts as a force for displacing the slider portion 182*b* in the left-right direction. This action increases toward the front away from the screwing point. On the other hand, an interval between the main body 182*b*1, and the right wall 11*d*13 and the left wall 11*d*14 of the guide rail 11*d*1 inclined by the draft expands toward the front. In this way, a front end portion of the slider portion 182*b* is greatly displaced in the left-right direction with the rotation of the first screw 181. Since the displacement of the slider portion 182*b* is transmitted to the shaft 52 of the leveling actuator 15 through a coupling portion (not shown) integrally formed, there is a possibility that the precise adjustment of the reference position of the optical axis A can be hindered.

On the other hand, in the slider portion 82*b* according to the present embodiment, the main body 82*b*1 is screwed with the first screw 81 at the front portion thereof. Further, the front portion of the main body 82*b*1 is wider than the rear portion thereof, and is in contact with the right wall 11*d*13 and the left wall 11*d*14 of the guide rail 11*d*1 without any gap. Therefore, the moment occurring due to the rotation operation of the first screw 81 is reliably absorbed, and the displacement in the left-right direction of the slider portion 82*b* is prevented.

As shown in FIG. 24, an interval between the upper wall 11*d*11 and the lower wall 11*d*12 of the guide rail 11*d*1 also expands toward the front by the draft. The moment occurring due to the rotation operation of the first screw 81 acts as a force for displacing the slider portion 82*b* in the upper-lower direction. However, this force is absorbed by elasticity of the upper holding piece 82*b*4 and the lower holding piece 82*b*5. Therefore, the displacement in the upper-lower direction of the slider portion 82*b* is also prevented.

Since the backlash of the slider portion 82*b* within the guide rail 11*d*1 is prevented, the rotation action of the first screw 81 is accurately and reliably transmitted to the leveling actuator 15. In this way, the adjustment of the reference position of the optical axis A can be accurately and reliably performed.

The above embodiments are not intended to limit the present invention, but are intended to facilitate the understanding of the present invention. It is apparent that the present invention can be modified and improved without departing from the gist thereof, and the equivalents thereof are included in the present invention.

In the above embodiment, the lens holder 13 is formed with the fitting groove 13*g* extending in the upper-lower direction and the third portion 93*c* of the link 93 similarly extending in the upper-lower direction is inserted into the fitting groove 13*g*. In this way, the tip end portion 93*c*1 of the third portion 93*c* serves as an acting point to which the rotation action of the second screw 91 is applied. According to this configuration, since, for example, the whole of the third portion 93*c* can be placed inside the right shaft portion 13*e*, it is possible to configure the structure near the acting point in a relatively small size. Accordingly, the degree of freedom in designing a decorative member or the like mounted to the lens holder is increased. However, the relationship between the groove and the acting point may be reversed.

Figure 27:
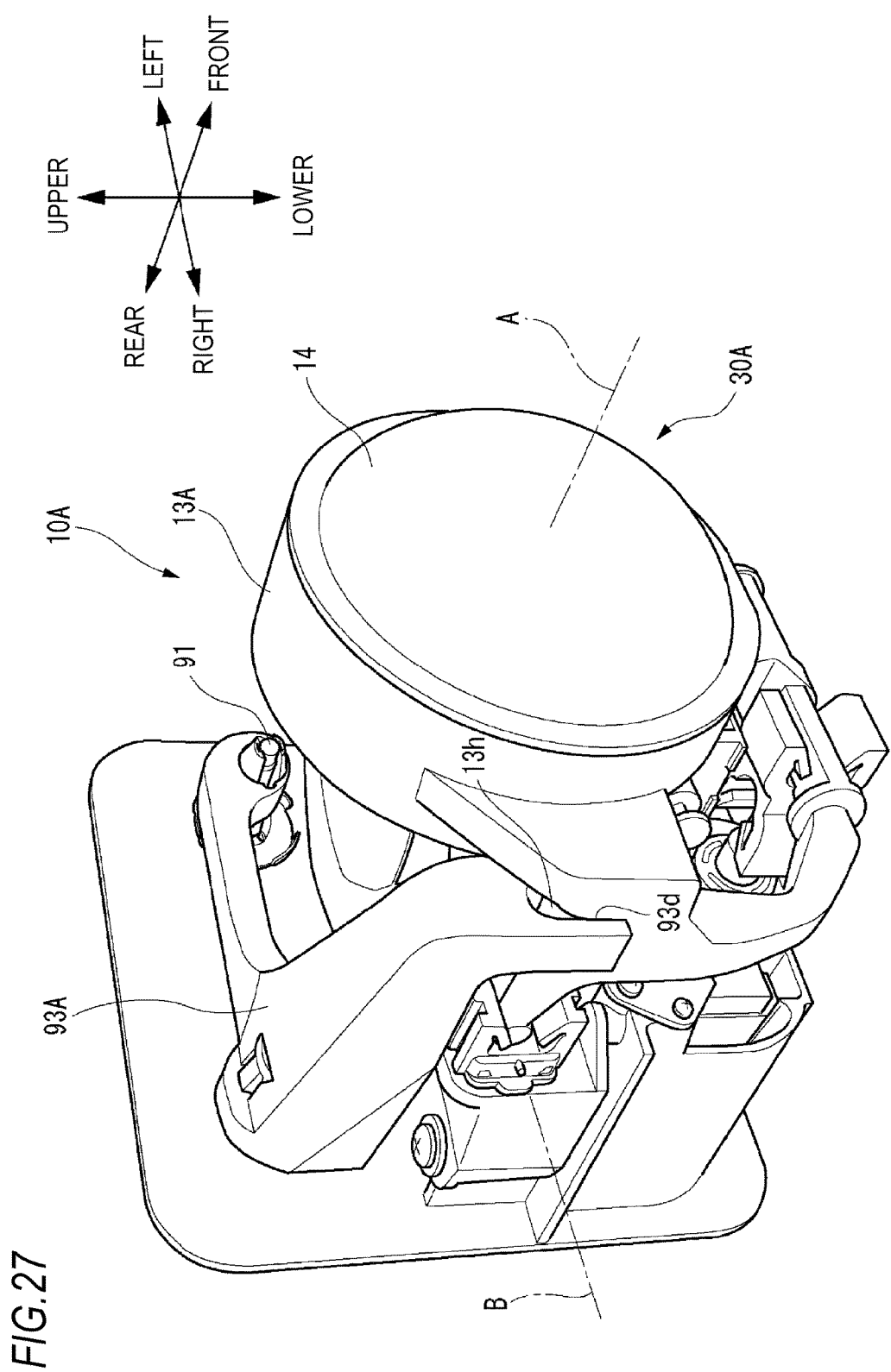
FIG. 27 is a perspective view showing a lamp unit according to a first modified example.

FIG. 27 shows a lamp unit 10A according to a first modified example. The substantially same or similar elements will be denoted by the same reference numerals as those of the lamp unit 10. The lamp unit 10A includes a lens unit 30A and a link 93A. The lens unit 30A includes a lens holder 13A. The link 93A is formed with a fitting groove 93*d* extending in the upper-lower direction. On the other hand, the lens holder 13A has a rod 13*h* which is fitted to the fitting groove 93*d*. That is, an acting point, to which the rotation action of the second screw 91 is applied, is a coupling portion of the rod 13*h* and the fitting groove 93*d*. The position of the acting point is located in a plane formed by the optical axis A and the reference axis B.

Figure 28:
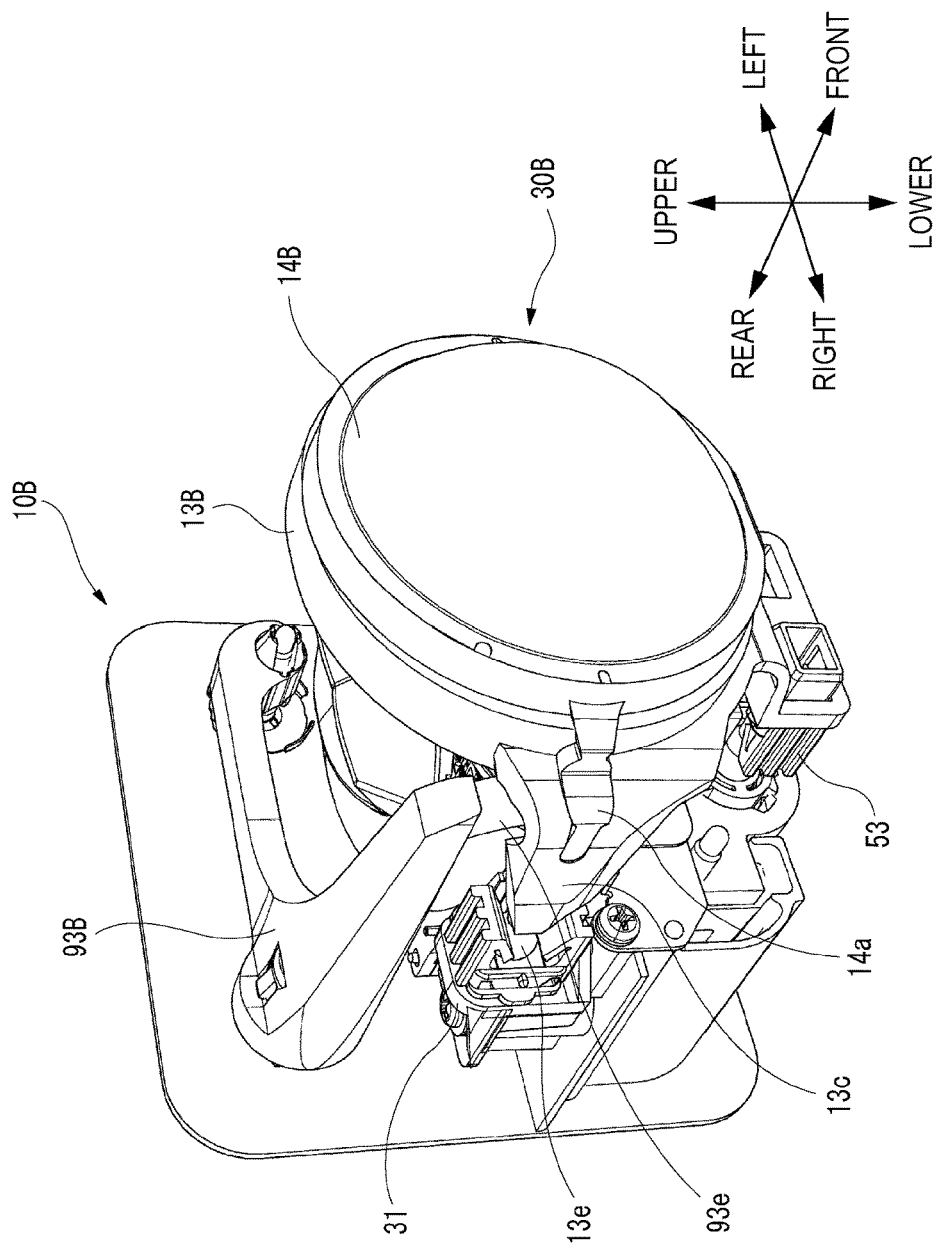
FIG. 28 is a perspective view showing a lamp unit according to a second modified example.

FIG. 28 shows a lamp unit 10B according to a second modified example. The substantially same or similar elements will be denoted by the same reference numerals as those of the lamp unit 10. The lamp unit 10B includes a lens unit 30B and a link 93B. The lens unit 30B includes a lens holder 13B and a projection lens 14B.

Figure 29:
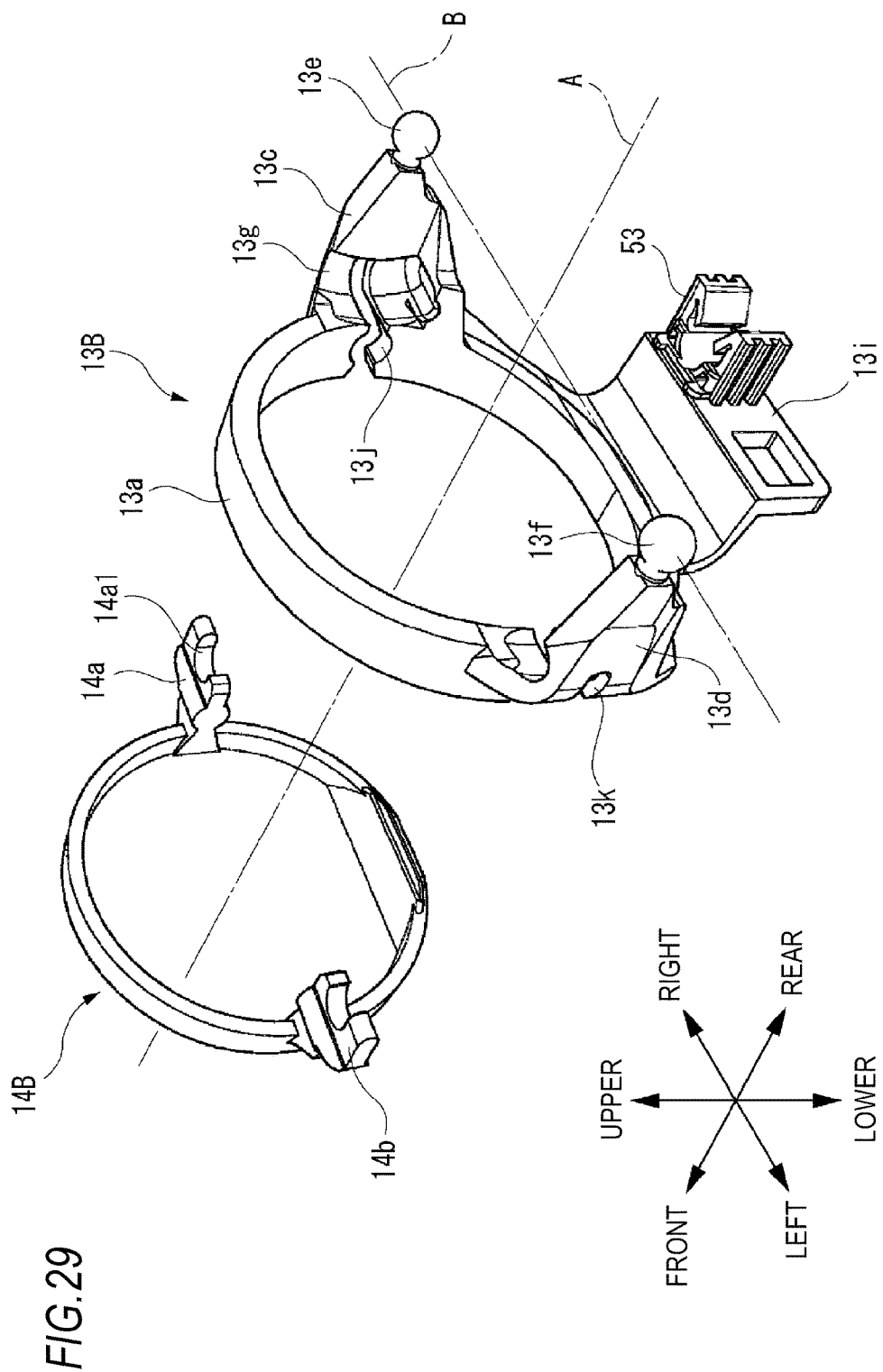
FIG. 29 is a perspective view showing a portion of the lamp unit shown in FIG. 28.

FIG. 29 is a perspective view of an exploded state of the lens holder 13B and the projection lens 14B, as seen from the rear. The lens holder 13B has a lower end portion 13*i*. The joint 53 of the leveling actuator 15 is fixed to the lower end portion 13*i*. That is, a front end portion of the joint 53 is not rotated relative to the lens holder 13B.

The lens holder 13B has a right slide groove 13*j* and a left slide groove 13*k*. The right slide groove 13*j* is formed at a portion of the lens holding portion 13*a* and the right arm portion 13*c*. The left slide groove 13*k* is formed at a portion of the lens holding portion 13*a* and the left arm portion 13*d*.

The projection lens 14B has a right arm portion 14*a* and a left arm portion 14*b*. The right arm portion 14*a* extends rearward from the right portion of the projection lens 14B. The right arm portion 14*a* is formed with a fitting groove 14*a*1. The left arm portion 14*b* extends rearward from the left portion of the projection lens 14B.

As the projection lens 14B is assembled from the front of the lens holder 13B, the right arm portion 14*a* of the projection lens 14B is disposed in the right slide groove 13*j* of the lens holder 13B. At this time, the fitting groove 14*a*1 formed in the right arm portion 14*a* is disposed in the fitting groove 13*g*. Further, the left arm portion 14*b* of the projection lens 14B is disposed in the left slide groove 13*k* of the lens holder 13B. In this state, the right arm portion 14*a* and the left arm portion 14*b* can be slid in the left-right direction within the right slide groove 13*j* and the left slide groove 13*k*, respectively. That is, the projection lens 14B is supported on the lens holder 13B to be movable in the extension direction of the reference axis B.

Figure 30:
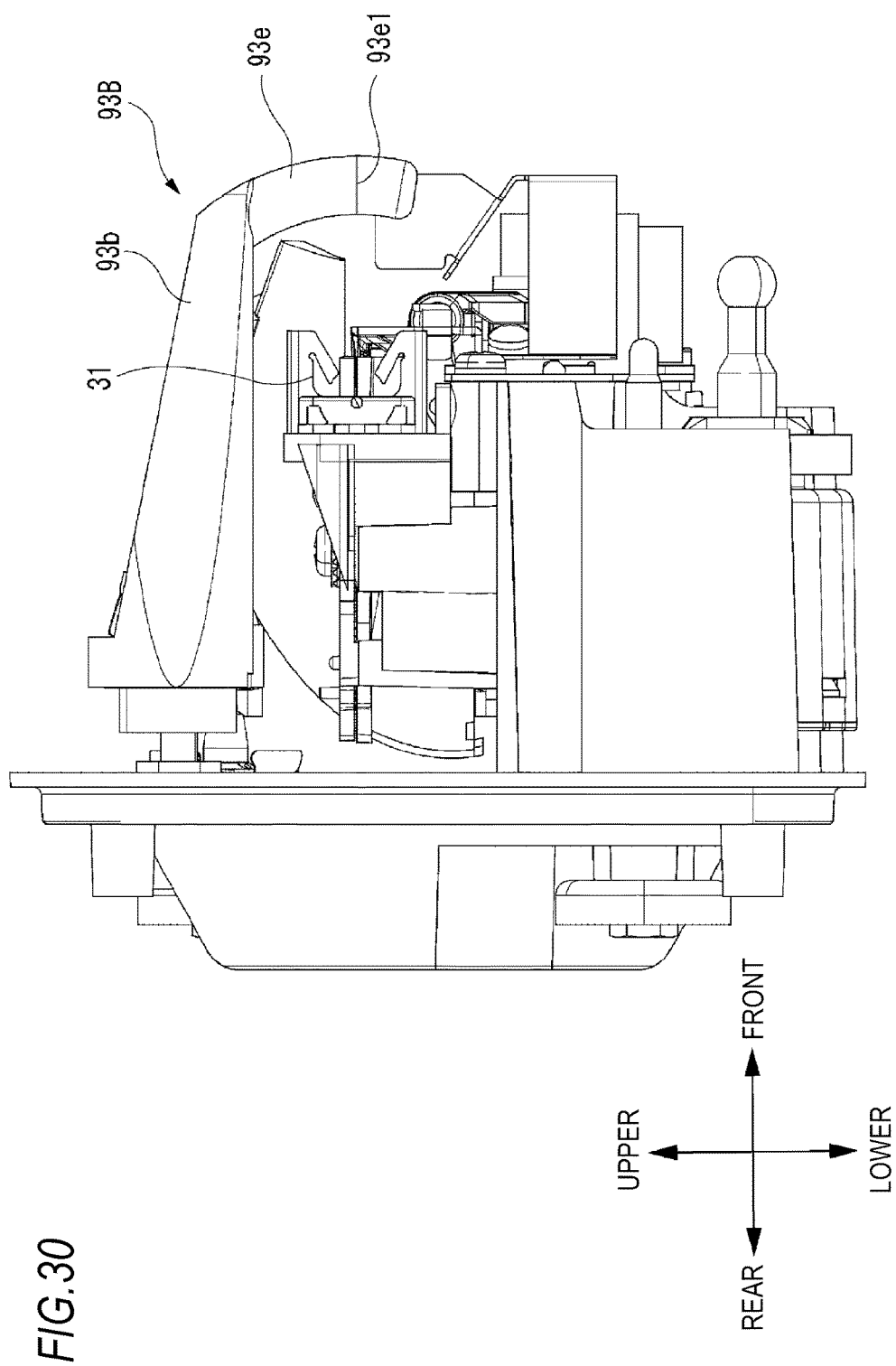
FIG. 30 is a right side view showing a portion of the lamp unit shown in FIG. 28.

FIG. 30 is a side view of the lamp unit 10B from which the lens unit 30B is detached, as seen from the right. The link 93B has a fitting rod 93*e*. The fitting rod 93*e* extends in an arc shape downward from the front end portion of the second portion 93*b*. An acting portion 93*e*1 which is a portion of the fitting groove 93*e* extends in the upper-lower direction. As shown in FIG. 29, the fitting groove 13g included in the lens holder 13B also extends in an arc shape to match the shape of the fitting rod 93e.

When the lens unit 30B is mounted as shown in FIG. 28, the fitting rod 93e of the link 93 is fitted into the fitting groove 13g of the lens holder 13B and the fitting groove 14a1 of the projection lens 14B. At this time, the acting portion 9e31 is disposed at the same position as the right shaft portion 13e of the lens holder 13B with respect to the upper-lower direction.

FIG. 31 is a top view for explaining the movement of each part of the lamp unit 10B according to the rotation of the second screw 91. FIG. 31A shows an initial state.

When the second screw 91 is rotated to the left from the above state, the first portion 93a of the link 93 is pushed forward via the joint 92. Consequently, the link 93 is rotated to the right with the fulcrum member 94 as a rotation axis, and the right arm portion 14a of the projection lens 14B is pushed to the right via the joint rod 93e. In this way, the right arm portion 14a and the left arm portion 14b of the projection lens 14B are slid to the right in the right slide groove 13j and the left slide groove 13k of the lens holder 13B, respectively. Further, the right shaft portion 13e and the left shaft portion 13f are moved to the right in the fitting grooves 31b, 32b of the right bearing 31 and the left bearing 32, respectively. Therefore, as shown in FIG. 31B, the optical axis A of the projection lens 14B which is a portion of the lens unit 30B is translated to the right.

On the other hand, when the second screw 91 is rotated to the right, the first portion 93a of the link 93 is pushed rearward via the joint 92. Consequently, the link 93 is rotated to the left with the fulcrum member 94 as a rotation axis, and the right arm portion 13c of the lens holder 13 is pushed to the left via the third portion 93c. In this way, the right arm portion 14a and the left arm portion 14b of the projection lens 14B are slid to the left in the right slide groove 13j and the left slide groove 13k of the lens holder 13B, respectively. Further, the right shaft portion 13e and the left shaft portion 13f are moved to the left in the fitting grooves 31b, 32b of the right bearing 31 and the left bearing 32, respectively. Therefore, as shown in FIG. 31C, the optical axis A of the projection lens 14B which is a portion of the lens unit 30B is translated to the left.

That is, as the head portion 91a of the second screw 91 is operated, the reference position in the left-right direction of the optical axis A of the projection lens 14B is adjusted. A force of translating the optical axis A acts on the projection lens 14B via the acting portion 93e1 of the fitting rod 93e. An acting point of the force is disposed in a plane formed by the optical axis A and the reference axis B.

According to this configuration, the projection lens 14B can be directly moved in an extension direction of the reference axis B by the operation of the second screw 91. In this way, it is possible to suppress a moment of tilting the optical axis A in the left-right direction even when an acting point of the force to move the optical axis A is spaced apart from the reference axis B with respect to the direction of the optical axis A. Accordingly, it is possible to further improve the adjustment accuracy of the optical axis A while reducing the occupying space of the lamp unit 10B including a mechanism for adjusting the reference position of the optical axis A.

In the above embodiment, the lamp units 10, 10A, 10B are assembled from the inside of the housing 2. However, the lamp units 10, 10A, 10B may be assembled from the outside of the housing 2, so long as the support table 11b of the heat sink 11, which supports at least the light source unit 12, is disposed in the lamp chamber 3.

The light source 21 is not limited to a light emitting diode. Other semiconductor light emitting element (an organic EL element, a laser diode, etc.) or a lamp light source (an incandescent lamp, a halogen lamp, a discharge lamp, a neon lamp, etc.) may be used. Further, the shape of the reflector 23 can be any shape, so long as at least a portion of the light emitted from the light source 21 can pass through the projection lenses 14, 14B.

It is not necessarily required that the light distribution control unit 16 is fixed to the support table 11b of the heat sink 11 by the fixing members 64a, 64b. The light distribution control unit 16 can be fixed by a proper method, so long as the light source mounting portion 11b8 is arranged to avoid the shortest path from the supported site to the portion of the heat sink 11 exposed to the outside.

It is not necessarily required that the operation control unit 17 is fixed to the control unit accommodating portion 11e of the heat sink 11 by the fixing member 64c. The operation control unit 17 can be fixed by a proper method, so long as the light source mounting portion 11b8 is arranged to avoid the shortest path from the supported site to the portion of the heat sink 11 exposed to the outside.

It is not necessarily required that the first control circuit 71a, the second control circuit 71b and the third control circuit 71c are provided on the same board 71. These control circuits can be placed at proper sites of the lamp units 10, 10A, 10B, as necessary.

It is not necessarily required that the main surface of the board 71 extends in the upper-lower direction. The direction of the main surface can be properly determined, depending on the specifications of the lamp units 10, 10A, 10B, so long as the main surface extends in a direction intersecting with the extension direction of the right table 11b1 and the left table 11b2.

The rear ends of the right table 11b1 and the left table 11b2 are not necessarily continuous. The cut-out 11b3 may reach the rear plate 11a, and the right table 11b1 and the left table 11b2 may be completely spaced apart from each other.

In the above embodiment, the light source 21 is disposed on the upper side of the support table 11b, and the leveling actuator 15 and the operation control unit 17 are disposed on the lower side thereof. However, depending on the specifications of the lamp units 10, 10A, 10B, the leveling actuator 15 and the operation control unit 17 may be disposed on the upper side of the support table 11b, and the light source 21 may be disposed on the lower side thereof.

The direction of the optical axis A of the projection lenses 14, 14B, which are displaced by the leveling actuator 15, is not necessarily set to a direction corresponding to the upper-lower direction of a vehicle. For example, the direction may be set to a direction corresponding to the left-right direction of the vehicle and the leveling actuator may be used as a swivel actuator.

In the case where it is not required to form a plurality of light distribution patterns by using a single light source 21, it is not required to provide the light distribution control unit 16 including the movable shade 61.

That is, the lighting device, on which the lamp units 10, 10A, 10B according to the present invention are mounted, is not limited to the headlamp device 1. The present invention can be applied to a lamp mounted to a suitable vehicle lighting device, so long as the lamp is utilized in an application where it is required to adjust the reference position of the optical axis A of the projection lenses 14, 14B.

This application is based on Japanese Patent Application No. 2013-173985 filed on Aug. 23, 2013, Japanese Patent Application No. 2013-173986 filed on Aug. 23, 2013, Japanese Patent Application No. 2013-173987 filed on Aug. 23, 2013, and Japanese Patent Application No. 2013-173990 filed on Aug. 23, 2013, the contents of which are incorporated herein by reference.

What is claimed is:

1. A lamp to be mounted on a vehicle, the lamp comprising:
   a light source;
   a lens unit including a projection lens which is disposed such that at least a portion of light emitted from the light source passes there through, and a holder which supports the projection lens; and
   an adjustment mechanism configured to adjust a reference position of an optical axis of the projection lens,
   wherein the adjustment mechanism includes:
      a reference axis perpendicular to the optical axis and disposed in a plane which intersects with a focal point of the projection lens;
      a first screw configured to adjust the reference position in a first direction;
      a second screw configured to adjust the reference position in a second direction intersecting with the first direction;
      a first transmission mechanism configured to rotate the lens unit about the reference axis in accordance with rotation of the first screw; and
      a second transmission mechanism configured to move at least a portion of the lens unit in an extension direction of the reference axis in accordance with rotation of the second screw, and
   wherein an acting point of a force by the second transmission mechanism to move the optical axis is disposed in a plane formed by the optical axis and the reference axis.

2. The lamp according to claim 1,
   wherein the force by the second transmission mechanism to move the optical axis acts on the holder.

3. The lamp according to claim 1,
   wherein the projection lens is supported on the holder to be movable in the extension direction of the reference axis, and
   wherein the force by the second transmission mechanism to move the optical axis acts on the projection lens.

4. The lamp according to claim 1, wherein the reference axis is formed on a portion of the holder.

5. The lamp according to claim 1, wherein the first direction corresponds to an upwards and downwards direction with respect to the front of the vehicle.

6. The lamp according to claim 5,
   wherein the first transmission mechanism includes an actuator having a drive shaft for displacing the optical axis in the first direction, and
   wherein the first screw and the drive shaft are arranged along an extension direction thereof.

7. The lamp according to claim 1, further comprising:
   a heat sink which supports the light source,
   wherein the first screw and the second screw extend through the heat sink.

* * * * *